(12) United States Patent
Blasinski et al.

(10) Patent No.: US 8,391,142 B2
(45) Date of Patent: Mar. 5, 2013

(54) ACCESS WINDOW ENVELOPE CONTROLLER IN WIRELESS NETWORK

(75) Inventors: Jeffrey John Blasinski, Dublin, OH (US); Oleg Berzin, Huntington Valley, PA (US)

(73) Assignees: Verizon Patent and Licensing, Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 422 days.

(21) Appl. No.: 12/703,833

(22) Filed: Feb. 11, 2010

(65) Prior Publication Data
US 2011/0194539 A1    Aug. 11, 2011

(51) Int. Cl.
  *H04L 12/28* (2006.01)
  *H04W 4/00* (2009.01)
  *H04J 3/00* (2006.01)
  *G06F 15/173* (2006.01)
(52) U.S. Cl. ........ 370/230; 370/338; 370/437; 370/464; 709/223
(58) Field of Classification Search .......... 370/229–241, 370/310–350, 431–437, 464–469, 477–478; 455/450–455, 507–520; 709/223, 225–226, 709/232, 234, 238–244
See application file for complete search history.

(56) References Cited

U.S. PATENT DOCUMENTS

| | | | |
|---|---|---|---|
| 6,539,026 B1 * | 3/2003 | Waclawsky | 370/428 |
| 7,161,914 B2 * | 1/2007 | Shoaib et al. | 370/331 |
| 7,426,195 B2 | 9/2008 | Mukherjee et al. | |
| 7,519,026 B1 | 4/2009 | Oh | |
| 7,562,393 B2 | 7/2009 | Buddhikot et al. | |
| 8,112,475 B2 * | 2/2012 | Tran et al. | 709/203 |
| 2004/0208183 A1 * | 10/2004 | Balachandran et al. | 370/395.21 |
| 2007/0195788 A1 | 8/2007 | Vasamsetti et al. | |
| 2007/0218918 A1 | 9/2007 | Liu et al. | |
| 2008/0279216 A1 * | 11/2008 | Sharif-Ahmadi et al. | 370/465 |
| 2009/0122808 A1 * | 5/2009 | Sharif-Ahmadi et al. | 370/458 |
| 2009/0279479 A1 | 11/2009 | Gandhi et al. | |
| 2009/0296613 A1 | 12/2009 | Kahn et al. | |
| 2010/0205612 A1 * | 8/2010 | Bhatia et al. | 719/314 |
| 2011/0176503 A1 * | 7/2011 | Patel et al. | 370/329 |

* cited by examiner

*Primary Examiner* — Tri H Phan

(57) ABSTRACT

A method may include receiving a packet destined to a wireless node, buffering the packet, and scheduling a time at which to transmit the packet to the wireless node. Scheduling the packet may include determining an application-layer protocol associated with the packet. The method may also include wirelessly transmitting the packet to the wireless node at the scheduled time. In one embodiment, the method may also include sending information to a node that originated the packet indicating that the packet is buffered. In another embodiment, sending information to the node that originated the packet indicating that the packet is scheduled to be wirelessly transmitted at the scheduled time.

24 Claims, 15 Drawing Sheets

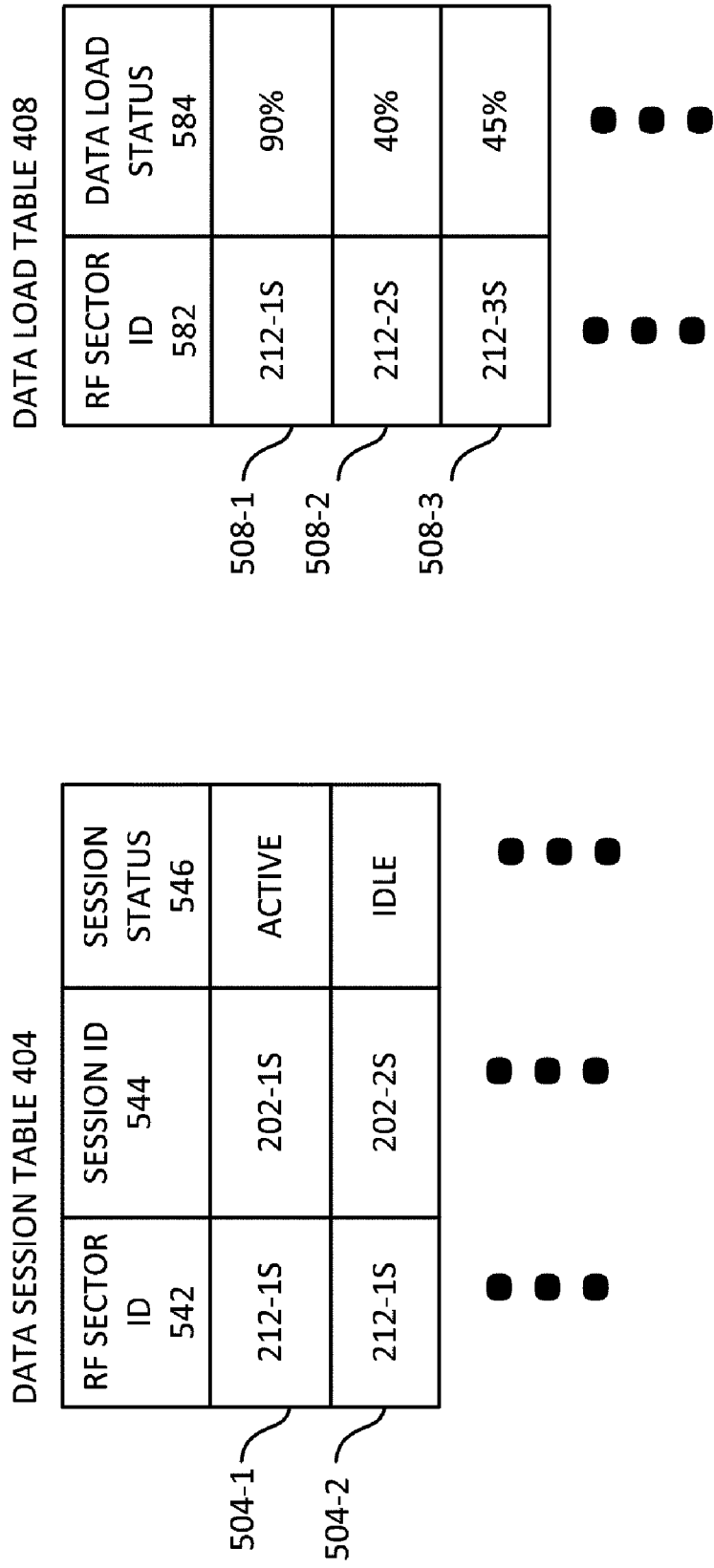

FIG. 5D

| RULE TABLE 454 | | | | | |
|---|---|---|---|---|---|
| | PACKET TYPE 552 | SEMANTIC 553 | DATA LOAD STATUS 555 | DATA SESSION STATE 556 | ACTION 557 |
| 554-1 | SNMP | GET | >75% | IDLE, ACTIVE | BEST EFFORT, MAX DELAY=1 HR |
| 554-2 | SNMP | GET | <25% | ACTIVE | SEND PACKET IMMEDIATELY |
| 554-3 | SNMP | GET | <25% | IDLE | SEND NEXT WINDOW |
| 554-4 | SIP | INVITE | >75% | IDLE | SEND NEXT WINDOW, MAX DELAY=3 SECONDS |
| 554-5 | SIP | INVITE | >75% | ACTIVE | SEND PACKET IMMEDIATELY |
| 554-6 | SIP | INVITE | <25% | ACTIVE, IDLE | SEND PACKET IMMEDIATELY |
| 554-7 | VPN | KEEP ALIVE | <25% | ACTIVE, IDLE | SEND PACKET IMMEDIATELY |
| 554-8 | VPN | KEEP ALIVE | >75% | ACTIVE, IDLE | BEST EFFORT, MAX DELAY=15 MIN. |
| | ••• | ••• | ••• | ••• | ••• |

US 8,391,142 B2

ACCESS WINDOW ENVELOPE CONTROLLER IN WIRELESS NETWORK

BACKGROUND INFORMATION

Businesses and individuals increasingly rely on wireless communication networks for receiving and sending data, a trend that is likely to continue. For example, a mobile phone may receive email, news alerts, instant messages, etc. Fixed devices, in addition to mobile devices, may also use wireless communication networks for receiving and sending data. As the use of wireless communication networks for data increases, the load on wireless communication networks has increased and is expected to continue to increase.

BRIEF DESCRIPTION OF THE DRAWINGS

FIG. 5A is a block diagram of an exemplary data session table;

FIG. 5B is a block diagram of an exemplary data load table;

FIG. 5D is a block diagram of an exemplary rule table;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

RF spectrum is a valuable, finite asset to a wireless network provider (e.g., a cellular provider) because it is the medium that allows customers to communicate wirelessly. The RF spectrum may carry customer data, including voice and data. As wireless communication continues to grow, an increasing number of devices request routine access to the RF spectrum for sending and receiving data. Some of this data may be considered more important than other data (e.g., critical data versus non-critical data).

Figure 1:
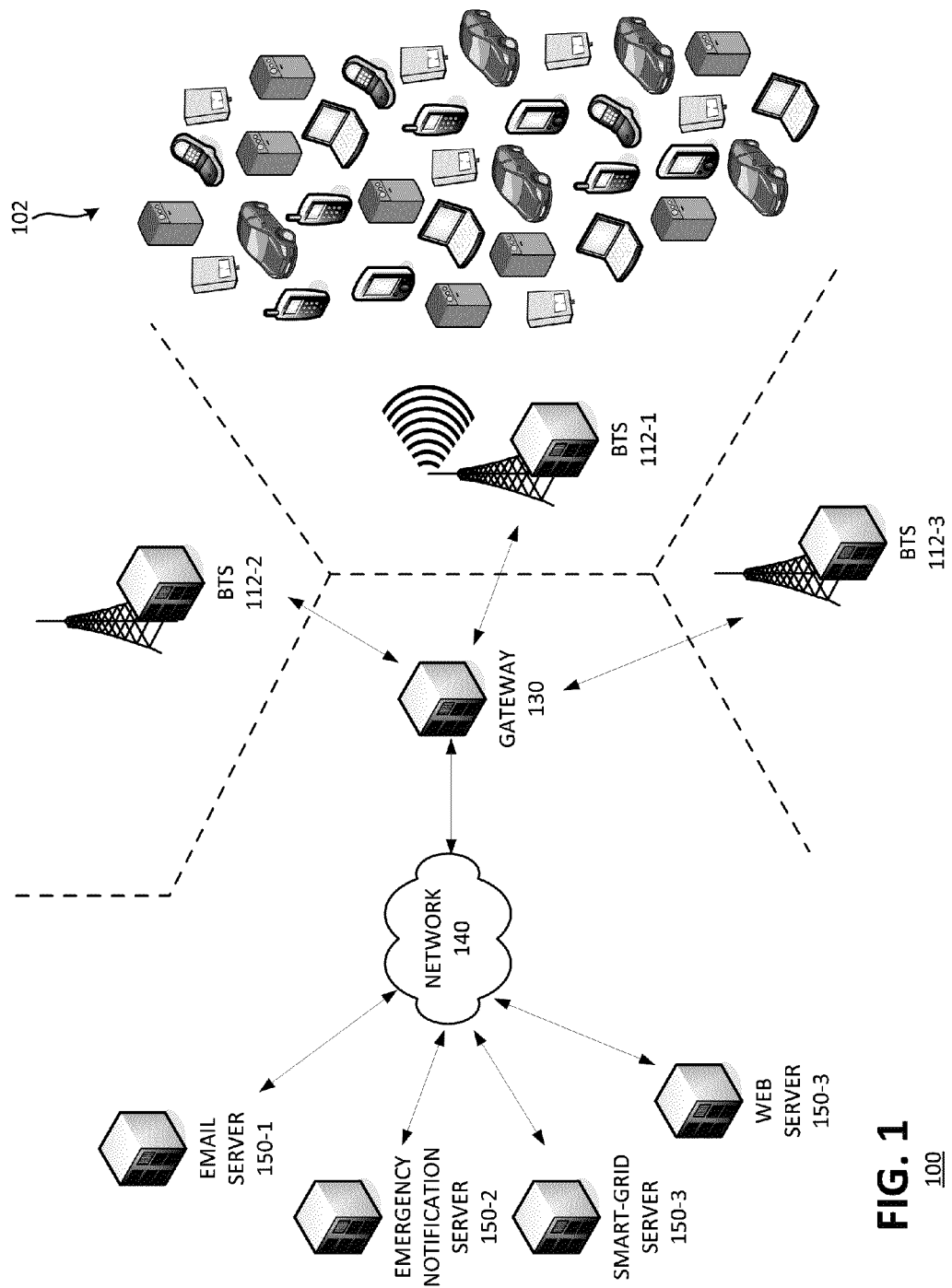
FIG. 1 is a diagram of an overview of an exemplary environment for embodiments described herein.

FIG. 1 is a diagram of an overview of an exemplary environment 100 for embodiments described herein. Environment 100 may include a practically unlimited variety of wireless devices 102, including mobile phones, wireless routers, internet tablets, laptops, personal digital assistants (PDAs), vehicles, appliances, electric meters, etc. The vehicles among devices 102 may include, for example, wireless navigation systems, asset tracking systems, and/or mobile application content. The appliances among devices 102 may include, for example, household appliances (depicted in FIG. 1 as dishwashers) with remote control technology. The electric meters among devices 102 may include, for example, household electric meters with smart-grid technology, phasor measurement units (PMUs), etc. Each of devices 102 may connect to a base transceiver station (BTS) 112-1 (e.g., a cell tower) for wireless communications with network 140 (e.g., the Internet) through gateway 130, for example. The wireless devices may connect to application servers 150, e.g., an email server 150-1, an emergency notification server 150-2, a smart-grid server 150-3, or a web server 150-4, among other types of servers (e.g., a server that controls multiple appliance servers).

Each wireless device may request connections with BTS 112-1 or receive data from BTS 112-1 regardless of the relative importance or urgency of the data or the needs of other devices. For example, the power-use information sent from an electric meter to smart-grid server 150-3 may be less urgent than (1) an email sent from email server 150-1 to a mobile phone, or (2) a command from smart-grid server 150-3 to a dishwasher instructing the dishwasher to turn on. One or more embodiments disclosed herein may allow for the more efficient use of the RF spectrum by scheduling windows during which wireless nodes may receive or transmit data. In one embodiment, some data may be queued or buffered and transmitted to a wireless node during a scheduled window. For example, data traffic related to routine access to wireless nodes for monitoring the node's health and performance (e.g., management traffic) may be queued or buffered and transmitted to the wireless node during the scheduled window. Further, one or more embodiments may allow for the management RF resources without application servers 150 or wireless nodes 102 considering the relative importance or urgency of their data relative to the data of other devices.

Figure 2:
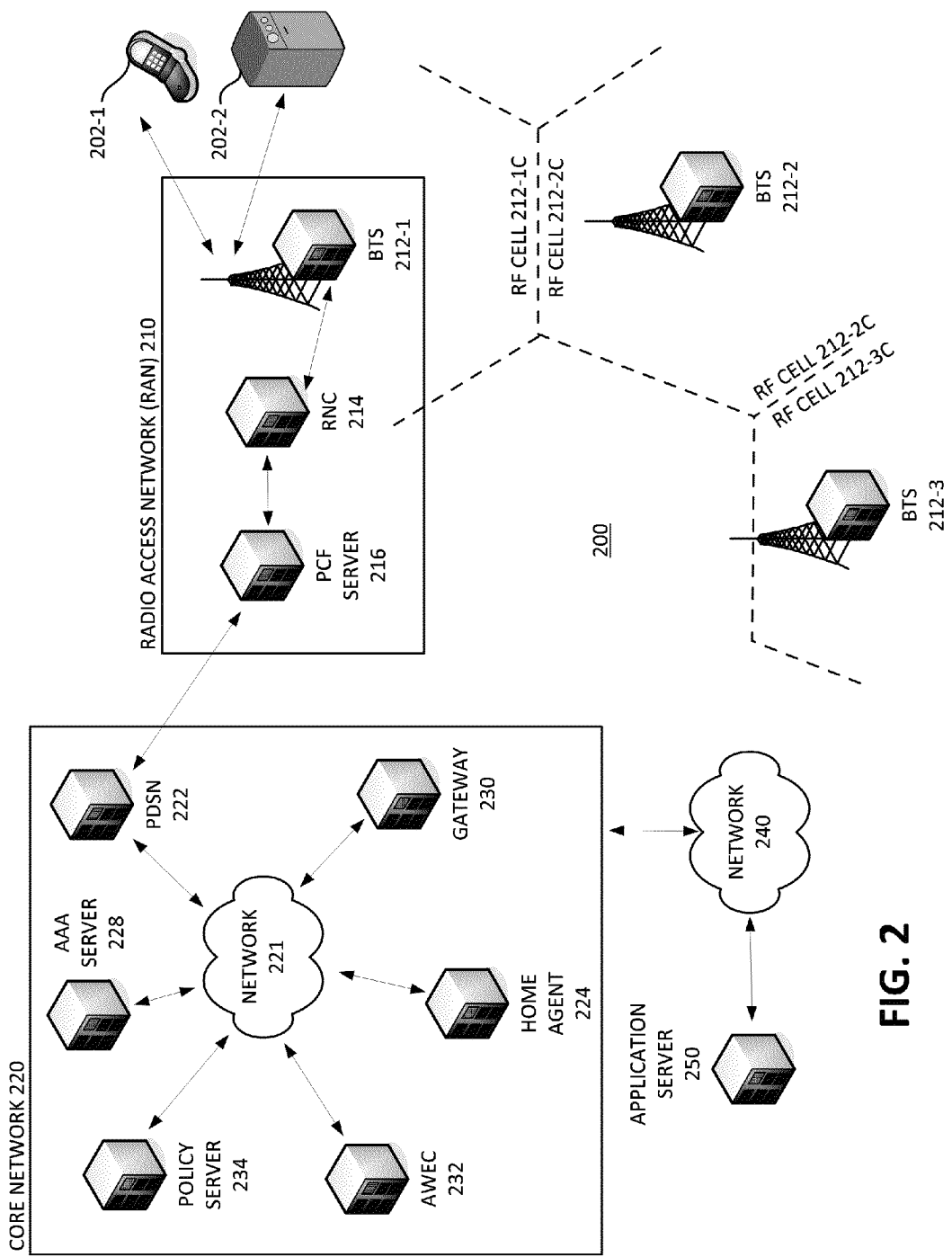
FIG. 2 is a diagram of an exemplary network for implementing embodiments described herein.

FIG. 2 is a diagram of an exemplary network 200 for implementing embodiments described herein. Network 200 may include a radio access network (RAN) 210 and a core network 220. RAN 210 may support communications to/from wireless nodes (e.g., a wireless nodes 202-1 and 202-2) associated with RAN 210. Core network 220 may support communications to/from wireless nodes associated with the RAN 210 (e.g., wireless node 202-1) and nodes that may not be associated with RAN 210, e.g., an application server 250 coupled to core network 220 through a network 240.

Wireless nodes 202-1 and 202-2 (collectively "wireless nodes 202," individually "wireless node 202-x") may include any of wireless devices 102 discussed above. For example, wireless nodes 202 may include a mobile phone, a radiotelephone, a personal communications system (PCS) terminal, a personal digital assistant (PDA), a laptop, a sensor with an RF radio, or another communication device. Wireless nodes 202 may communicate wirelessly with RAN 210 using any number of protocols, such as CDMA2000. In other embodiments, wireless nodes 202 may communicate wirelessly using GSM (Global System for Mobile Communications), CDMA (Code-Division Multiple Access), WCDMA (Wideband CDMA), GPRS (General Packet Radio Service), EDGE (Enhanced Data Rates for GSM Evolution), LTE (Long-Term Evolution), Universal Mobile Telecommunications System (UMTS), High-Speed Downlink Packet Access (HSDPA), etc. In one embodiment, mobile nodes 202 may communicate with other devices using wireless network standards such as WiFi (e.g., IEEE 802.11x) or WiMAX (e.g., IEEE 802.16x).

Each wireless node 202-x may be associated with a unique International Mobile Subscriber Identity (IMSI). As depicted in the example of FIG. 2, wireless node 202-1 is a mobile phone and wireless node 202-2 is a dishwasher.

As shown in FIG. 2, RAN 210 may include a Base Transceiver Station (BTS) 212-1, a Radio Network Controller (RNC) 214, and a packet control function (PCF) server 216. BTS 212-1 may include an antenna to transmit and receive RF signals to and from wireless nodes 202. Wireless nodes 202 may be associated with BTS 212-1, e.g., wireless nodes 202 may be in the RF region covered by BTS 212-1 ("RF cell 212-1C"). Other BTSs may cover other RF regions. For example, BTS 212-2 may cover RF cell 212-2C and BTS 212-3 may cover RF cell 212-3C.

RNC 214 may control the functionality of BTS 212, including call control logic and interconnections to a mobile switching center (not shown), other RNCs, and neighboring BTSs for handing off mobile wireless nodes. RNC 214 may receive data from a wireless node and may transfer the data to PCF server 216. PCF server 216 may relay and manage the relay of data (e.g., packets) between RNC 214 and a packet data serving node (PDSN) 222 (discussed below).

Core network 120 may include a network 221, PDSN 222, a Home Agent 224, an Authentication, Authorization, and Accounting (AAA) server 228, a gateway 230, an access-window envelope controller (AWEC) 232, and a policy server 234.

Network 221 may allow components in core network 220 to communicate with each other and with a network 240. In one embodiment, network 221 may include a packet-switched, private Internet Protocol (IP) network. Network 221 may also employ the Ethernet Protocol, Synchronous Optical Networking (SONET), Asynchronous Transfer Mode (ATM), etc. Network 240 may include a local area network (LAN), a wide area network (WAN), a virtual private network (VPN), etc. Network 221 may also include wired and/or wireless data networks.

PDSN 222 may establish, maintain, and terminate link-layer sessions to wireless nodes 202. PDSN 222 may employ a point-to-point protocol (PPP) to establish sessions (e.g., "data sessions") with wireless nodes 202. Using a session, PDSN 222 may route data packets to or from wireless nodes 202. PDSN 222 may also route data packets to other nodes (e.g., application server 250) through gateway 230, home agent 224, network 221, and/or network 240.

Home agent 224 may support communications between PDSN 222, gateway 230, and network 240 for wireless nodes 202 associated with BTS 212-1. When one of wireless nodes 202 travels from an RF cell 212-x associated with one BTS 212-x to a another RF cell, a PDSN (e.g., PDSN 222) may employ a "foreign agent" and the mobile IP protocol to allow the traveling wireless node to maintain the same IP address. For example, PDSN 222 may employ a foreign agent that may support communications between PDSN 222 and a home agent associated with the foreign RF cell (e.g., home agent 224) using, for example, a mobile IP tunnel.

AAA server 228 may authenticate (e.g., verify the identity of) wireless node 202. AAA server 228 may also authorize (e.g., control access of) wireless node 202 to use network resources, such network 221, gateway 230, and/or network 240, for example. AAA server 228 may implement AAA protocols, such as 802.1X, RADIUS (Remote Authentication Dial-In User Service), etc. AAA server 228 may also account for the consumption of network resources by wireless nodes 202 for billing.

Gateway 230 may receive packets sent from a wireless node 202-x for delivery to another node, such as application server 250. Gateway 230 may also receive packets from nodes, such as application server 250, for delivery to a wireless node 202-x. In one embodiment, home agent 224 may include gateway 230. In another embodiment, gateway 230 may include a device or entity separate from home agent 224. In one embodiment, gateway 230 may be situated such that it receives all packets going to and/or from wireless nodes 202 (e.g., all the wireless nodes) in a particular RF region (e.g., an RF cell or a portion or sector of an RF cell). In an LTE architecture, for example, gateway 230 may include a packet data network (PDN) gateway. Gateway 230 may determine whether a packet should be managed (e.g., using an access window) and, if not, may forward the packet to its destination wireless node 202-x. If the packet should be managed, then gateway 230 may hold the packet before forwarding it to its destination (e.g., a wireless node).

AWEC 232 may monitor data connections (e.g., PPP connections or data sessions) established between PDSN 222 and wireless nodes 202. AWEC 232 may also monitor the data load (e.g., heavy, moderate, or light) associated with BTSs, such as BTS 212-1. AWEC 232 may also schedule windows (e.g., time periods) during which to send queued or buffered packets to wireless nodes 202.

Policy server 234 may store information indicating which packets should be managed (e.g., managed by AWEC 232) and how they should be managed. Policy server 234 may also store information indicating which packets should not be managed (e.g., packets that should be immediately forwarded to a wireless node).

Network 240 may allow application server 250 to communicate with components of core network 220 and ultimately a wireless node, for example. Network 240 may include a packet-switched network, such as the public Internet. Network 240 may include a wired and/or wireless data network. Network 240 may include a LAN, a WAN, a VPN, a personal area network (PAN), etc. Network 240 may also include one or more circuit-switched networks, such as a PSTN.

Application server 250 may include one or more computer modules for hosting programs, databases, and/or applications. For example, application server 250 may include application servers 150 discussed above with respect to FIG. 1 (e.g., email server 150-1, emergency notification server 150-2, smart-grid server 150-3, and/or web server 150-4) or any other type of server that hosts any other type of application. In one embodiment, application server 250 may also include another wireless device or another user device, such as a mobile phone or a home computer.

A number of the components of FIG. 2 may operate together to implement an AWEC system. The exemplary configuration of devices in network 200 is illustrated for simplicity. Network 200 may include more devices, fewer devices, or a different configuration of devices than illustrated in FIG. 2. For example, network 200 may include a Network Time Protocol (NTP) server for synchronizing the time between devices (e.g. application server 250 and gateway 230). Further, gateway 230 may be coupled to many BTSs and/or many PDSNs. Further, network 200 may include many more gateways 230 between network 240 and BTSs. As another example, network 200 may include thousands or millions of wireless nodes 202 spread across thousands of RF cells 212.

In some embodiments, the functions performed by two or more devices may be performed by any one device. Likewise, in some embodiments, the functions performed by any one device may be performed by multiple devices. Further, in some embodiments, the functions performed by any one device may be performed by software running in any number of physical devices. The connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
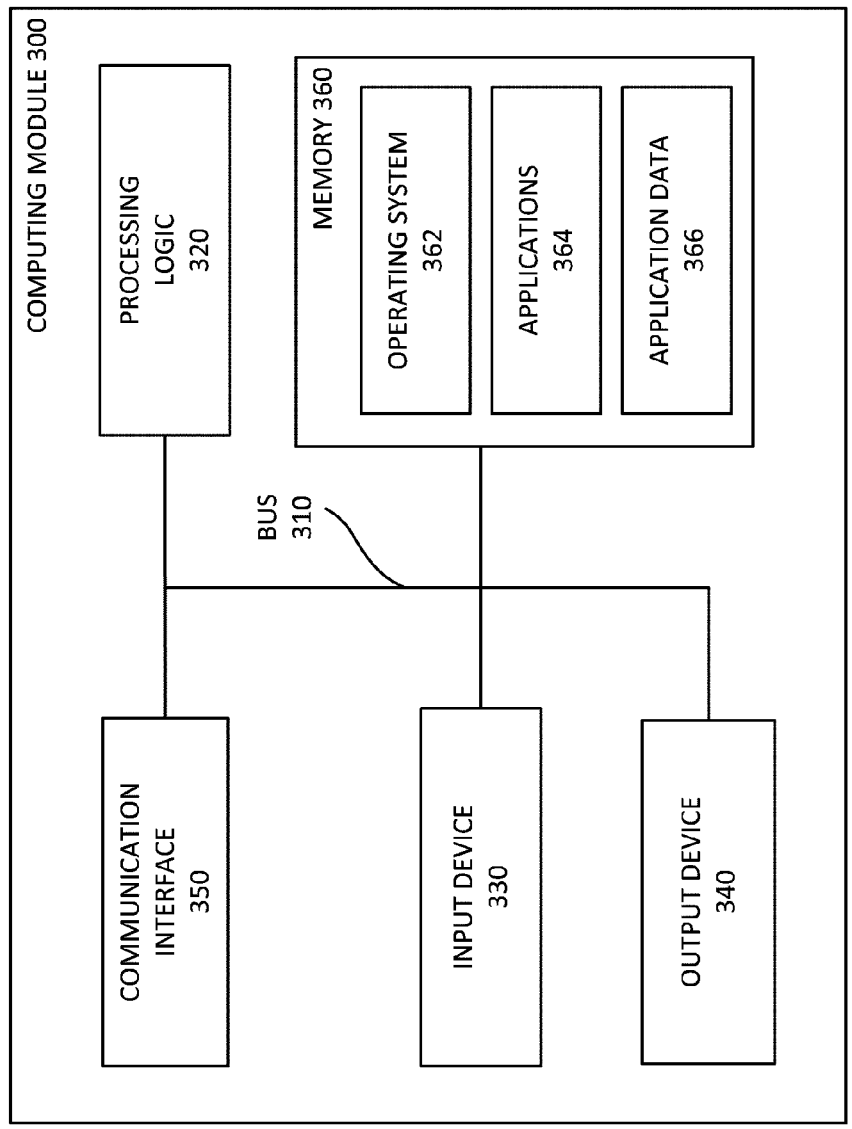
FIG. 3 is a block diagram of exemplary components of a computing module.

FIG. 3 is a block diagram of exemplary components of a computing module 300. Devices in network 200 may each include one or more computing modules 300. For example, wireless node 202-1 may include a computing module 300. Application server 250 may also include a computing module 300.

Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may allow a user to input information into computing module 300. Input device 330 may include a keyboard, a mouse, a pen, a microphone, a remote control (e.g., remote control 258), a touch-screen display, etc. Output device 340 may output information to the user. Output device 340 may include a display, a printer, a speaker, etc. For example, wireless node 202-1 may include a display (an output device), which may include a liquid-crystal display (LCD) for displaying content to the user. As another example, wireless device 202-2 may include light-emitting diodes (LEDs) to display the status of the dishwasher to the user. Input device 330 and output device 340 may allow the user to receive and view a menu of options and select from the menu options.

Some devices, such as application server 250 and policy server 234 may be managed remotely and may not include input device 330 or output device 340. In other words, some devices may be "headless" and may not include a keyboard, for example.

Communication interface 350 may include a transceiver that enables computing module 300 to communicate with other devices and/or systems. Communication interface 350 may include a transmitter that may convert baseband signals to radio frequency (RF) signals and/or a receiver that may convert RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, etc.

Memory 360 may store, among other things, instructions (e.g., applications 364 and operating system (OS) 362) and data (e.g., application data 366). Memory 360 may include a random access memory (RAM) or another type of dynamic storage device that may store information and instructions; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

OS 362 may include software instructions for managing hardware and software resources of computing module 300. For example, OS 362 may include Linux, Windows, OS X, Android, an embedded operating system, etc. Applications 364 and application data 366 may provide network services or include applications, depending on the device in which the particular computing module 300 is found. For example, applications 364 may include an access window scheduler for scheduling data sessions with a wireless node. Other examples of applications are discussed below with respect to FIGS. 4A through 4C.

Computing module 300 may be controlled by electronic circuitry, code (e.g., assembly code), firmware, software, etc. Computing module 300 may perform operations described herein in response to processing logic 320 executing software instructions contained in a computer-readable medium, such as memory 360. A computer-readable medium include a physical or logical memory device. The software instructions may be read into memory 360 from another computer-readable medium or from another device via communication interface 350. The software instructions contained in memory 360 may cause processing logic 320 to perform processes that are described herein.

Figure 4A:
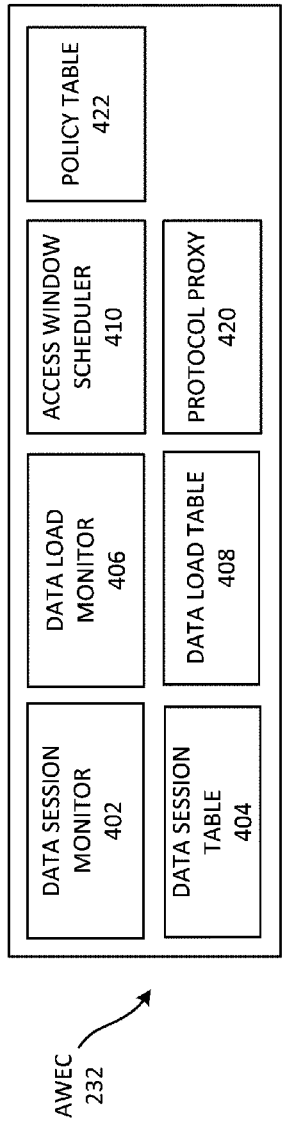
FIG. 4A is a block diagram of exemplary functional components and/or memory components of the radio frequency (RF) Access Window Envelope Controller (AWEC) of FIG. 2.

AWEC 232 may include a computing module 300. FIG. 4A is a block diagram of exemplary functional components and/or memory components of AWEC 232 (e.g., stored in memory 360 of AWEC 232). AWEC 232 may include a data session monitor 402, a data session table 404, a data load monitor 406, a data load table 408, an access window scheduler 410, a protocol proxy 420, and a policy table 422.

Data session monitor 402 may monitor data sessions (e.g., PPP sessions) between wireless nodes 202 and PDSN 222 associated with a particular RF cell, such as the RF cell BTS 212-1C. In one embodiment, data session monitor 402 may acquire session information from PDSN 222. In one embodiment, data session monitor 402 may terminate a PPP session established between a PDSN and a wireless node.

Data session monitor 402 may store data in data session table 404. FIG. 5A is a block diagram of an exemplary data session table 404. Data session table 404 may include an RF sector ID field 542, a session ID field 544, and a session status field 546. Data session table 404 may include additional, different, or fewer fields than illustrated in FIG. 5A.

RF sector ID field 542 may identify an RF region, such as an RF cell or a portion of an RF cell (e.g., a sector in an RF cell). Some embodiments may include more than one RF sector for each RF cell and/or each BTS, for example. In the example of FIG. 5A, for simplicity and ease of explanation, BTS 212-1 and RF cell 212-1C are assumed to have only one sector (identified by sector ID of 212-1S); BTS 212-2 and RF cell 212-2C are assumed to have one sector (identified by sector ID of 212-2S); and BTS 212-3 and RF cell 212-3C are assumed to have one sector (identified by sector ID of 212-3S). In data session table 404, a sector is identified by the letter "S" appended to the end of the identity of the corresponding BTS. Only the RF sector identified with BTS 212-2 (e.g., sector 212-1S) includes data in FIG. 5A.

Session ID field 544 may identify a data session with a wireless node in the corresponding RF sector identified in field 542. In data session table 404, a session is identified by the letter "S" appended to the end of the identity of the wireless node. For example, for RF sector 212-1S, two sessions are identified: session 202-1S (e.g., to wireless node 202-1) and session 202-2S (e.g., to wireless node 202-2).

Session status field 546 indicates whether the session is active or idle. An active session is an open data session to the corresponding wireless device. An idle session indicates that there is no open data session to the corresponding wireless device. An idle session may become active if, for example, the corresponding wireless device sends a request to open a session to the corresponding BTS and the wireless device is authenticated and authorized. Session status field 546 may indicate the state of a PPP session, for example, using RF resources. Application-layer sessions may be established and active between, for example, application server 250 and a wireless node even though a data session (e.g., a PPP, data-link layer session) may be idle.

Returning to FIG. 4A, data load monitor 406 may determine the data load for the RF sectors covered by BTSs. The data load of a BTS may be determined, in one embodiment, by the number of active data sessions associated with the corresponding BTS (e.g., the number of PPP connections between PDSN 222 and all the wireless devices in the RF sector). The data load may also be determined by the cumulative data rate to/from the RF sector (e.g., between BTS 212-1 and all the wireless nodes 202 in RF sector 212-1S). The data load may be determined based on both the number of data sessions and the cumulative data rate to/from the RF sector. The cumulative data rate in an RF sector may be determined by monitoring the data traffic through gateway 230 because, in one embodiment, all the data traffic to and from a particular RF sector passes through gateway 230.

Data load monitor 402 may acquire data session information from PDSN 222, which may store session information for one or more BTSs, and/or an instance of data session table 404. In another embodiment, data load monitor 402 may infer the data session information from data traffic going to/from PDSN 222 (e.g., through gateway 230). Thus, in one embodiment, the data load may be determined indirectly without receiving session information directly from PDSN 222. Further, in one embodiment, the amount of data traffic passing through RAN 210, BTS 212-1, RF cell 212-1C, or a portion or sector of RF cell 212-1C may also be inferred by the traffic passing through gateway 230.

Data load monitor 406 may store data regarding the data load of RF sectors in data load table 408. FIG. 5B is a block diagram of an exemplary data load table 408. Data load table 408 may include an RF sector ID field 582 and a data load status field 584. Data load table 408 may include additional, different, or fewer fields than illustrated in FIG. 5B.

RF sector ID field 582 may identify an RF region, such as an RF cell or a portion of an RF cell (e.g., a sector in an RF cell). The three RF sectors (212-1S, 212-2S, and 212-3S) associated with the RF cells shown in FIG. 2 (212-1C, 212-2C, and 212-3C) and associated with BTS 212-1, 212-2, and 212-3 include data in the example of FIG. 5B.

Data load status field 584 may include an indication of the current data load of the corresponding RF sector. For example, RF sector 212-1S currently has a 90% data load. RF sectors 212-2C and 212-3C currently have 40% and 45% data loads, respectively. In this embodiment, a 100% data load may indicate that the data path for the corresponding RF sector ID is fully utilized and cannot handle additional data traffic. On the other extreme, a 0% and 45% data load may indicate that the data path for the corresponding RF sector ID is not currently being used at all or is at 45% of full capacity, respectively. In this example, data load status field 584 may include any value between 0% (no data load) and 100% (full data load). A system administrator may configure how the data load status is calculated for different RF sectors and may be based on the total RF resources available for an RF sector (e.g., whether RF band sharing is enabled or not). Other indications may be used to indicate the current load, such as "heavy," "moderate," and "light." In this embodiment, a system administrator may set thresholds for what corresponds to "heavy," "moderate," and "light." Any industry-standard value to indicate data load may be used for data load status field 584.

Returning to FIG. 4A, access window scheduler 410 may determine the start time and duration of windows (e.g., time periods) during which packets may be sent to a wireless node. Access window scheduler 410 may also determine the start time and duration of windows during which a wireless node may send packets to a BTS. Access window scheduler 410 may take a number of conditions into account when scheduling an access window. For example, as described in further detail below, the scheduled window may be based on one or more of the following: the current data load of the RF sector associated with the wireless node; the type of wireless node; the type of packets (e.g., the type of protocol) being forwarded to or received from a wireless node; the number of data sessions of the RF sector associated with the wireless node; and the number of policy violations recorded for a wireless node. Access window scheduler 410 may determine the start and duration of windows based on policies stored in, for example, policy server 234 (e.g., in a rule table or a management table).

Access window durations (e.g., scheduled by access window scheduler 410) may range from seconds to minutes to hours, for example. The frequency of access windows (e.g., the start times scheduled by access window scheduler 410) may also range from seconds to minutes to hours, for example. An access window for sending SNMP packets to wireless node 202-x, for example, may occur every 5 minutes and may have a duration of 30 seconds. In one embodiment, other access windows for SNMP packets for other wireless nodes 202 in the same RF sector may have the same frequency and duration, but may be staggered so that wireless nodes 202 in the same RF sector are not all receiving and transmitting management data at the same time.

In one embodiment, access window scheduler 410 may schedule the duration and start times of access windows on a time scale such that different network devices (e.g., application server 250 and gateway 230) may accurately know when an access window is open or closed. For example, as discussed above, network 200 may employ NTP to synchronize time between devices. NTP may be able to maintain time between devices (e.g., clock disparity) to within 10 ms over the public Internet. Further, latency in the public network across a continent may be 25 ms, 100 ms, or even greater (e.g., a second). Therefore, in this example, access window scheduler 410 may schedule the start times of access windows at least a few seconds apart so that devices in network 200 can accurately track and schedule the transmission of data to arrive at gateway 230 during an open access widow. Further, at 1 Mbps, a 1 MB (8 Mb) data file (e.g., an SNMP Management Information Base (MIB)) may take 8 seconds to transmit. Therefore, in this example, access window scheduler 410 may schedule a window duration of 30 seconds (to account for varying data file sizes and transmission rates). An access window duration may be smaller than 30 seconds (e.g., 1 second), but access window scheduler 410 may account for latency (100 ms) and clock disparities (e.g., 10 ms) and may, as a result, schedule an access window duration of no more than a few seconds (e.g., the same as the minimum time between the start of access windows), for example. In addition, in one embodiment, the duration of an access window should be long enough for the transmission of the smallest data unit (e.g., one packet). In a private network (e.g., where latency and/or clock drift may be smaller), the minimum time period between access windows may be smaller.

Protocol proxy 420 may include logic to interpret protocol messages being sent between wireless nodes and other nodes. For example, protocol proxy 420 may interpret SNMP (Simple Network Management Protocol) messages in received packets so that gateway 230 may hold SNMP messages and respond to the source of the SNMP message. In one embodiment, protocol proxy 420 may spoof messages on behalf of a wireless node in response to packets received. In another embodiment, protocol proxy 420 may respond to protocol messages with information regarding access windows. Protocol proxy 420 may include an SNMP proxy, a VPN proxy, a SIP (Session Initiation Protocol) proxy, a smart grid control protocol proxy, and/or an ICMP (Internet Control Message Protocol) proxy, etc.

In some embodiments, protocol proxy 420 may handle a protocol that is "AWEC aware," e.g., the protocol is knowledgeable of AWEC. For example, if application server 250 employs an AWEC-aware protocol, the protocol may send packets from application server 250 to a wireless node at times during which an access window is open for that wireless node. Likewise, an AWEC-aware protocol may refrain from sending packets to from application server 250 to a wireless node at times during which no access window is open (e.g., the access window is closed) for that wireless node. To behave according to when access windows are open, an AWEC-aware protocol may also receive packets from proxy 420 with information regarding when access windows open and close, for example. Some protocols that currently are not AWEC aware may be extended to be AWEC aware. Examples of protocols that may be extended include SNMP, VPN, and ICMP. In one embodiment, when a protocol is not AWEC-aware, proxy 420 may operate to fool or trick other devices so that proxy 420 may delay delivery of a packet to a wireless node, without alarming the other devices, until an access window opens. For example, proxy server 420 may spoof messages on behalf of a wireless node when an access window is closed.

Policy table 422 may include criteria for determining the type of packets that are subject to AWEC management policies. For example, a packet that is not subject to AWEC policies may be forwarded to its destination node immediately. Policy table 422 may also include AWEC policies, e.g., the actions to be taken with respect to packets that are managed under AWEC policies. Policy table 422 may include information from an AWEC table and/or a rule table stored in policy server 234 and described below.

Figure 4B:
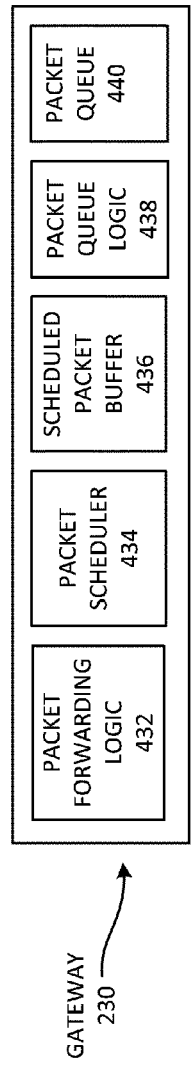
FIG. 4B is a block diagram of exemplary functional components and/or memory components of the gateway of FIG. 2.

Gateway 230 may include a computing module 300. FIG. 4B is a block diagram of exemplary functional components and/or memory components of gateway 230 (e.g., in memory 360 of gateway 230). Gateway 230 may include packet forwarding logic 432, a packet scheduler 434, scheduled packet buffer 436, packet queue logic 438, and packet queue 440.

Packet forwarding logic 432 may determine whether packets destined to a wireless node are forwarded or stored and forwarded at a later time based on policies stored in policy server 234. Packets destined to a wireless node that are stored and forwarded may be stored in a scheduled packet buffer 436 or a packet queue 440. Packets stored in scheduled packet buffer 436 may include packets that are scheduled to be sent to a wireless node during a future access window. Packet scheduler 434 may determine, based on policies stored in policy server 234, when to send packets stored in scheduled packet buffer 436 to a wireless node. Packets stored in packet queue 440 may include packets to be sent to wireless nodes on, for example, a best-effort basis. Packet queue logic 438 may determine, based on policies stored in policy server 234, when to send packets stored in packet queue 440 to a wireless node.

Figure 4C:
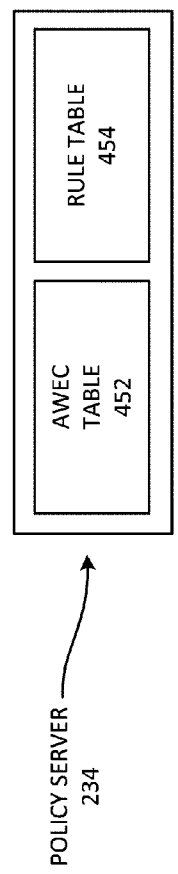
FIG. 4C is a block diagram of exemplary functional components and/or memory components of the policy server of FIG. 2.

Policy server 234 may include a computing module 300. FIG. 4C is a block diagram of exemplary functional components and/or memory components of policy server 234 (e.g., in memory 360 of policy server 234). Policy server 234 may include an AWEC table 452 and a rule table 454. AWEC table 452 may include criteria for determining the type of packets that are subject to AWEC management policies. For example, a packet that is not subject to AWEC policies may be forwarded to its destination node immediately. Rule table 454 may define the AWEC policies, e.g., the actions to be taken with respect to packets that meet the criteria specified in the table.

Figure 5C:
FIG. 5C is a block diagram of an exemplary AWEC table.

FIG. 5C is a block diagram of an exemplary AWEC table 452. AWEC table 452 includes a packet type field 592 and a flag field 594. AWEC table 452 may include additional, different, or fewer fields than illustrated in FIG. 5C. The information stored in AWEC table 452 may be set by a network administrator, for example.

Packet type field 592 specifies a type of packet that may be received by gateway 230 from a wireless node or another node for forwarding to a wireless node. As shown in FIG. 5C, packet types include responses to web requests (record 552-1), RTP (Real-Time Protocol) packets (record 552-2), SNMP packets (record 552-3), ICMP packets (record 552-4), VNC packets (record 552-3), and SIP packets (record 552-3). Types of packets other than those listed in AWEC table 452 are possible. In one embodiment, the packet type may include an application-layer protocol (e.g., VPN, SNMP, SIP, etc.). In another embodiment, the packet type may include a network-layer protocol (e.g., ICMP), a transport-layer protocol, a session-layer protocol, or a presentation-layer protocol.

Flag field 594 may indicate whether a packet should be managed according by AWEC 232 or not. In AWEC table 452, packets that should not be managed are indicated with NO and packets that should be managed are indicated with YES. As discussed below, packets indicated as unmanaged packets may be forwarded to the wireless node without the delay associated with the management of managed packets.

As mentioned above, AWEC table 452 may include additional field other than those shown in FIG. 5C. For example, AWEC table 452 may include a semantic field that specifies a command, a syntax, or a meaning assigned to a syntax, or a model of computation associated with the corresponding protocol and/or packet. For example, in one embodiment, flag field 594 may specify YES for a VPN packet type and a semantic of "keep alive," but NO for a VPN packet type and all other semantics. In one embodiment, AWEC table 452 specifies management-type protocol traffic that should be managed according to the rules specified in rule table 454. Further, AWEC table 452 may include additional fields to establish conditions for even more robust policies (e.g., variable policies). For example, a policy may be based on any type of condition, such as data load status, data session status, time of day, day of year, or any other condition (e.g., using an if/then/else conditional statements). In one embodiment, AWEC table 452 may include conditional statements based on whether a denial-of-service (DoS) attack has been detected. For example, flag field 594 may indicate NO for a VPN packet when the data load status is less than 20%, except when a DoS attack has been detected. In yet another embodiment, AWEC table 452 may also or alternatively be stored in other devices in network 200. For example, information from AWEC table 452 may be stored in (e.g., copied to) policy table 422 in AWEC 232.

In addition to AWEC table 452, policy server 234 may also store rule table 454. FIG. 5D is a block diagram of an exemplary rule table 454. Rule table 454 may include a packet type field 552, a semantic field 553, a data load state field 555, a data session state field 594, and an action field 557. Rule table 454 may include additional, different, or fewer fields than illustrated in FIG. 5D. The information stored in rule table 454 may be set by a network administrator, for example.

Rule table 454 may specify actions in action field 557 that may be taken if the criteria in the other fields (e.g., packet type field 552, semantic field 553, data load state field 555, and data session state field 594) are satisfied. Packet type field 552 may specify criteria for a type of packet that may be received by gateway 230 from a wireless node or another node for forwarding to a wireless node. For example, packet type may include SNMP packets, SIP packets, etc. In one embodiment, the packet type specified in field 553 may include an application-layer protocol (e.g., VPN, SNMP, SIP, etc.). In another embodiment, the packet type may include a network-layer protocol (e.g., ICMP), a transport-layer protocol, a session-layer protocol, or a presentation-layer protocol.

Semantic field 553 may specify criteria for a command, a syntax, or a meaning assigned to a syntax, or a model of computation associated with the packet. In one embodiment, semantic field 553 may specify a state associated with the protocol specified in packet type field 552. For example, a semantic may include GET (in the case of an SNMP packet), INVITE (in the case of a SIP packet), etc. In one embodiment, semantic field 553 may merely specify a criterion of the syntax of a packet.

Data load status field 555 may specify criteria for the current data load of the RF sector corresponding to the wireless node. For example, the action in action field 557 of rule 554-1 may only apply when the data load status is greater than 75%. In another embodiment, data load status field 555 may include "heavy" or "light," for example. Data session state field 556 may specify criteria for the state of the data session corresponding to the wireless node. In one embodiment, the data session may have an "active" or "idle" state. For example, the action in action field 557 of rule 554-2 may only apply when the data session state corresponding to the wireless node is "active." As mentioned above, action field 557 specifies the action to take, e.g., by gateway 230, if the criteria in the other fields are met. In one embodiment, rule table 454 specifies how management-type protocol traffic should be managed.

In one embodiment, rule table 454 may also or alternatively be stored in other devices in network 200. For example, information from rule table 454 may be stored in (e.g., copied to) policy table 422 in AWEC 232. In one embodiment, AWEC 232 may periodically retrieve information stored in rule table 454 and/or AWEC table 452 for storing in policy table 422. Rule table 554, AWEC table 552, and/or policy table 422 may allow for the policies of the AWEC system of FIG. 2 to be dynamic. That is, the criteria of policies defined in AWEC table 552, rule table 554, and/or policy table 422 may be based on conditions that vary or change with time.

Figure 4D:
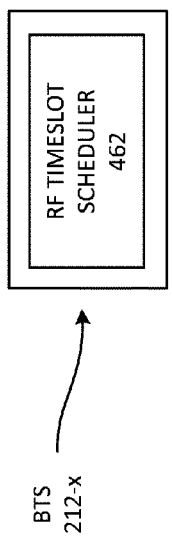
FIG. 4D is a block diagram of exemplary functional components and/or memory components of the base transceiver station of FIG. 2.

BTS 212-x may include a computing module 300. FIG. 4D is a block diagram of exemplary functional components and/or memory components of BTS 212-x (e.g., in memory 360 of BTS 212-1, for example). BTS 212-x may include an RF timeslot scheduler 462. RF timeslot scheduler 462 may schedule RF timeslots (e.g., the duration and start time of an RF timeslot) for transmitting data (e.g., packets) received from PDSN 222 and/or PCF server 216. BTS 212-x may also include queues (e.g., a buffers) (not shown) for each wireless node 202-x or may include a single queue for all wireless nodes 202. In one embodiment, the queue associated with one wireless node 202-x may be served at each scheduled RF timeslot. In one embodiment, a packet may extend over more than one RF timeslot. For example, in a CDMA network, a packet may occupy from one to sixteen RF timeslots, depending on the rate of data transmission, for example. In the case where a packet occupies multiple RF timeslots, a sequence of RF timeslots (not necessarily consecutive) may be scheduled so that the entire packet may be transmitted.

In one embodiment, RF timeslot scheduler 462 may schedule timeslots so that the RF channel conditions can be assumed to be constant over the duration of the timeslot. Such channel conditions may include fading effects, which can manifest over several milliseconds. An exemplary RF timeslot duration may be 1.7 ms, 0.5 ms, or 5.0 ms. Other RF timeslot durations are possible, such as 0.1 ms, 0.2 ms, 0.4 ms, 0.6 ms, 0.8 ms, 1.0 ms, 2.0 ms, 4.0 ms, 6.0 ms, 8.0 ms, 10 ms, etc. RF timeslot scheduler 462 may schedule timeslots so as to deliver packets at the maximum acceptable rate, based on channel conditions, interference conditions, and noise. In one embodiment, the duration of an RF timeslot (scheduled by RF timeslot scheduler 462) may be one, two, or three orders of magnitude smaller than the duration of an access window (scheduled by access window scheduler 410) (e.g., 10 ms for a timeslot versus a second or more for an access window). Likewise, packets held in scheduled packet buffer 436 and/or packet queue 440 may be held by one, two, or three orders of magnitude longer than in the queue in BTS 212-x.

Figure 6A:
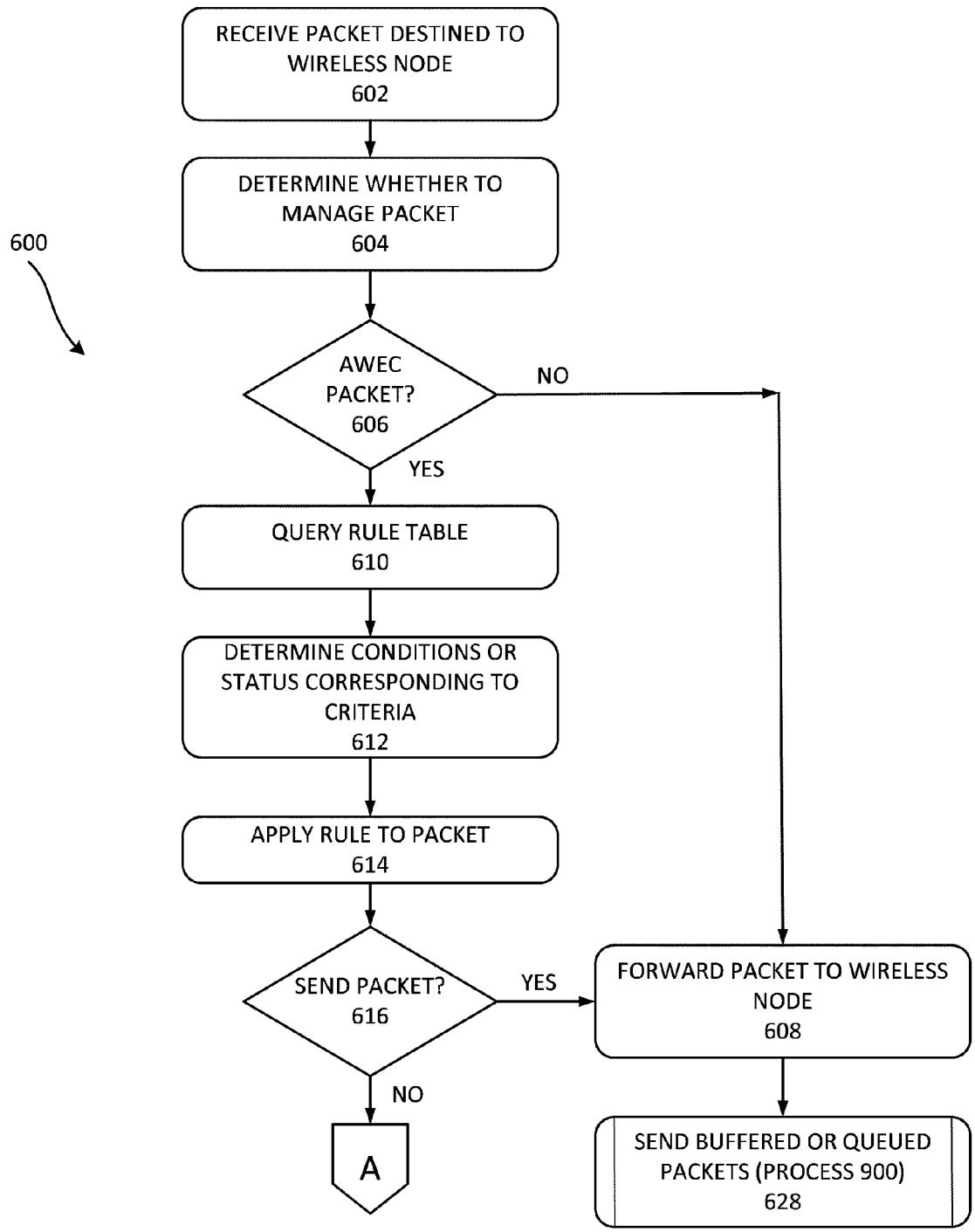
FIGS. 6A and 6B are flowcharts of an exemplary process for receiving packets destined to a wireless node.
Figure 6B:
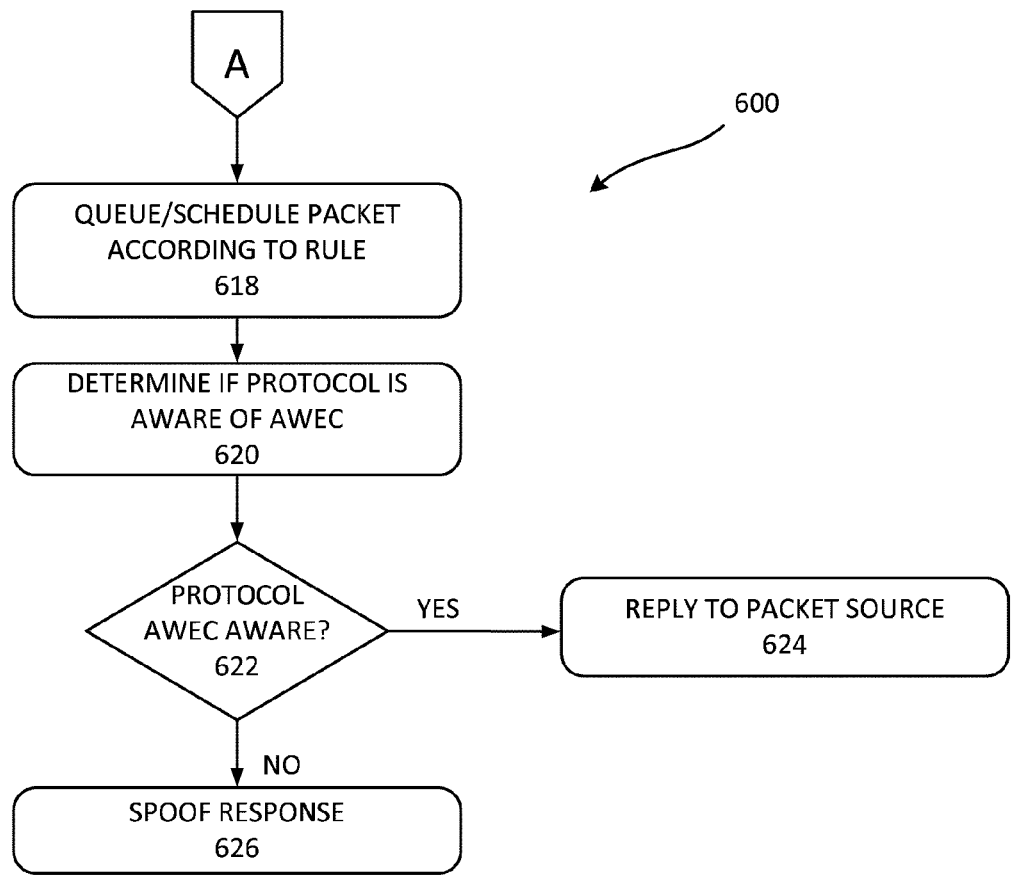

As mentioned above, gateway 230 may receive a packet destined to a wireless node 202-x. Gateway 230 may determine whether to forward the packet to the wireless node (e.g., according to AWEC table 452) or to manage the packet (e.g., according to rule table 454). FIGS. 6A and 6B are flowcharts of an exemplary process 600, which may be performed by packet forwarding logic 432, for receiving packets destined for a wireless node. All or portions of process 600 may be performed by gateway 230, AWEC 232, home agent 224, or other devices in network 200.

In the following example, assume that the user of wireless node 202-1 (e.g., a mobile phone) requested a web resource (e.g., over port 80) from application server 250, which is running a web server. In response to the request, application server 250 sends the resource to wireless node 202-1. Process 600 may begin with the receipt of a packet destined for a wireless node (block 602). In the above example, gateway 230 may receive one of the packets corresponding to the resource sent from application server 250 to wireless node 202-1. Whether to manage the received packet (e.g., using AWEC) may be determined (block 604). In one embodiment, whether to manage the packet may be determined based on the application-layer protocol and/or semantic associated with the packet. In the current example, gateway 230 may query AWEC table 452 (shown in FIG. 5C) to determine that responses to web requests are not managed. In another embodiment, gateway 230 may store a copy of AWEC table 452 in policy table 422 and may query policy table 422. Gateway 230 may recognize the received packet as a response to a web request because the source port of the packet may be 80, for example, or because the source IP address and destination port are associated by gateway 230 with the original web resource request by wireless device 202-1.

If the packet is not an AWEC-managed packet (block 606: NO), then the packet may be forwarded to the wireless node (block 608). In the above example, because the packet (a requested web resource) is not an AWEC-managed packet, it may be sent to wireless node 202-1, e.g., through home agent 224, PCF server 216, RNC 214, and BTS 212-1. In this way, the user of wireless node 202-1 may not experience delay related to AWEC while surfing the web. Sending the received packet to wireless node 202-1 may result in an active data session (e.g., a PPP connection) between wireless node 202-1 and PDSN 222. In this case, as described in more detail below with respect to FIG. 9 and process 900, packets previously stored in packet buffer 436 or packet queue 440 may also be sent (block 628) to wireless node 202-1.

As another example, assume that application server 250 is remotely managing wireless node 202-2 (e.g., a dishwasher) using the SNMP protocol. Application server 250 sends an SNMP packet including a GET command to wireless node 202-2 in order to receive configuration information from node 202-2 (e.g., its current state, whether it is in a functioning condition, etc.). In this case, gateway 230 receives the SNMP packet (block 602) and determines whether to manage the packet (block 604) (e.g., according to AWEC) by querying AWEC table 452 or policy table 422. As shown in FIG. 5C, AWEC table 452 indicates that SNMP packets are AWEC-managed packets.

If the packet is AWEC-managed (block 606: YES), then a rule table may be queried (block 610) to determine the criteria for forwarding the received packet to the wireless node. In the SNMP/GET example, because the received packet is AWEC-managed, gateway 230 may query rule table 454 (shown in FIG. 5D). In another embodiment, gateway 230 may store the information from rule table 454 in policy table 422 and may query policy table 422. The conditions or status corresponding to the criteria of the rule may be determined (block 612). In the SNMP/GET example, as shown in records 554-1 through 554-3 in FIG. 5D, the criteria for determining the action to take include determining the data load state, the data session state, and the command type. Thus, gateway 230 may query data session table 404 (shown in FIG. 5A), which indicates that data session 202-2S between PDSN 222 and wireless node 202-2 is currently idle (record 504-2). Gateway 230 may also query data load table 408 (shown in FIG. 5B), which indicates that that the load in RF sector 212-1S (corresponding to BTS 212-1) is 90% (record 508-1). Therefore, rule 554-1 of rule table 454 (shown in FIG. 5D) applies to the SNMP packet received by gateway 230 in this example. In one embodiment, for example, the criteria specified in rule table 454 may not include data load status 555 or data session state 594. In this embodiment, the data load state and RS session state are not taken into account when determining an action to take.

The rule may be applied, given the current conditions or status, to determine whether to forward the packet to the wireless node (block 614). In the current SNMP/GET example, rule 554-1 may be applied with the current data load status as 90%, and the current data session status as idle. If application of the rule indicates that the packet should not be sent to the wireless node (block 616: NO), then the packet may be queued or buffered according to the rule (block 618, FIG. 6B). Applying rule 554-1 (shown in FIG. 5D), the received SNMP packet with the GET command destined to wireless node 202-2 (with a 90% data load with an idle data session) should not be delivered immediately, but should be delivered on a best effort basis with a maximum delay of one hour. As such, the received SNMP packet may be placed in packet queue 440. If, however, data load table 404 indicated that the current state of RF sector 212-1S is 10% (rather than 90% in the example above), then rule 554-3 (shown in FIG. 5D) indicates that the SNMP/GET packet may be sent in the next window. In this case, the packet may be placed in scheduled packet buffer 436.

In one embodiment, if a packet does not fit any rule in rule table 454, then the packet may be forwarded to its destination without additional delay. In another embodiment, the criteria for applying the rule may include the application-layer protocol and/or semantic associated with the packet. In yet another embodiment, a packet placed in a queue may also be scheduled for delivery if a best-effort has not delivered the packet by the maximum delay time, for example.

A determination may be made regarding whether the packet is associated with a protocol that is aware of AWEC (block 620). For example, gateway 230 may determine whether the SNMP protocol used by application server 250 is knowledgeable of AWEC by examining the SNMP packet, which may indicate the version of SNMP being used. If the protocol is aware of AWEC (block 622: YES), then a response to the received packet may be sent to the source node of the packet (block 624). In the SNMP/GET example applying rule 554-1, assuming that the SNMP protocol being used by application server 250 is aware of AWEC, a response packet may be sent to application server 250 indicating that the GET command will be forwarded to wireless node 202-2 (e.g., the dishwasher) on a best effort basis, but within the hour. Thus, application server 250 may take note and avoid resending the GET command when a response is not immediately forthcoming from wireless node 202-2. In other embodiments, the response to the source of the packet may include other information, such as the when the next window will open if the received packet is scheduled for the next window. In this embodiment, the response may include a "window closed" message and a "next open window time" message. In one embodiment, a response may include an indication of an NTP (Network Time Protocol) server that proxy 420 may use for scheduling access windows.

If the protocol is not aware of AWEC (block 622: NO), then a response may be spoofed and sent to the source node (block 626). For example, if the SNMP protocol used by application server 250 is not aware of AWEC, then gateway 230 may send a response to the GET command in the received packet as though it came from wireless node 202-2 (e.g., spoof a response from wireless node 202-2). In the SNMP/GET example applying rule 554-1, gateway 230 may resend a previous response to a GET command that gateway 230 previously cached. Alternatively, gateway 230 may spoof a response to application server 250 (e.g., compliant with the version of the protocol known by application server 250) asking that application server 250 wait for a response to the GET command. In one embodiment, if the protocol is not aware of AWEC (block 622: NO), then policy server 234 may define how/when a packet should be spoofed, how/when packets may be dropped, or how/when packets should be allowed to pass to the wireless node without additional AWEC management.

Returning to block 616, as another example, assume that data load table 408 indicates that the current state of RF sector 212-1S is 10% and that data session 202-2S is active rather than idle. In this case, rule 554-2 applies to the received SNMP/GET packet rather than rules 554-1 or 554-3. Rule 554-2 indicates that the SNMP/GET packet should be sent immediately. If application of the rule indicates the packet should be sent (block 616: YES), then the packet may be forwarded to the wireless node (block 608). In the current example, gateway 230 may send the SNMP packet to wireless node 202-2 (e.g., through home agent 224, PCF server 216, RNC 214, and BTS 212-1) without further delay.

After forwarding a packet to a wireless node, an active data session may be established between wireless node 202-x and PDSN 222 (e.g., an Early Open Window Event (EOWE)). As such, an opportunity to forward packets stored in packet queue 440 and/or packet buffer 436 may arise. To take advantage of this opportunity, process 900 may be executed (block 628), which is discussed below with respect to FIG. 9.

Figure 7:
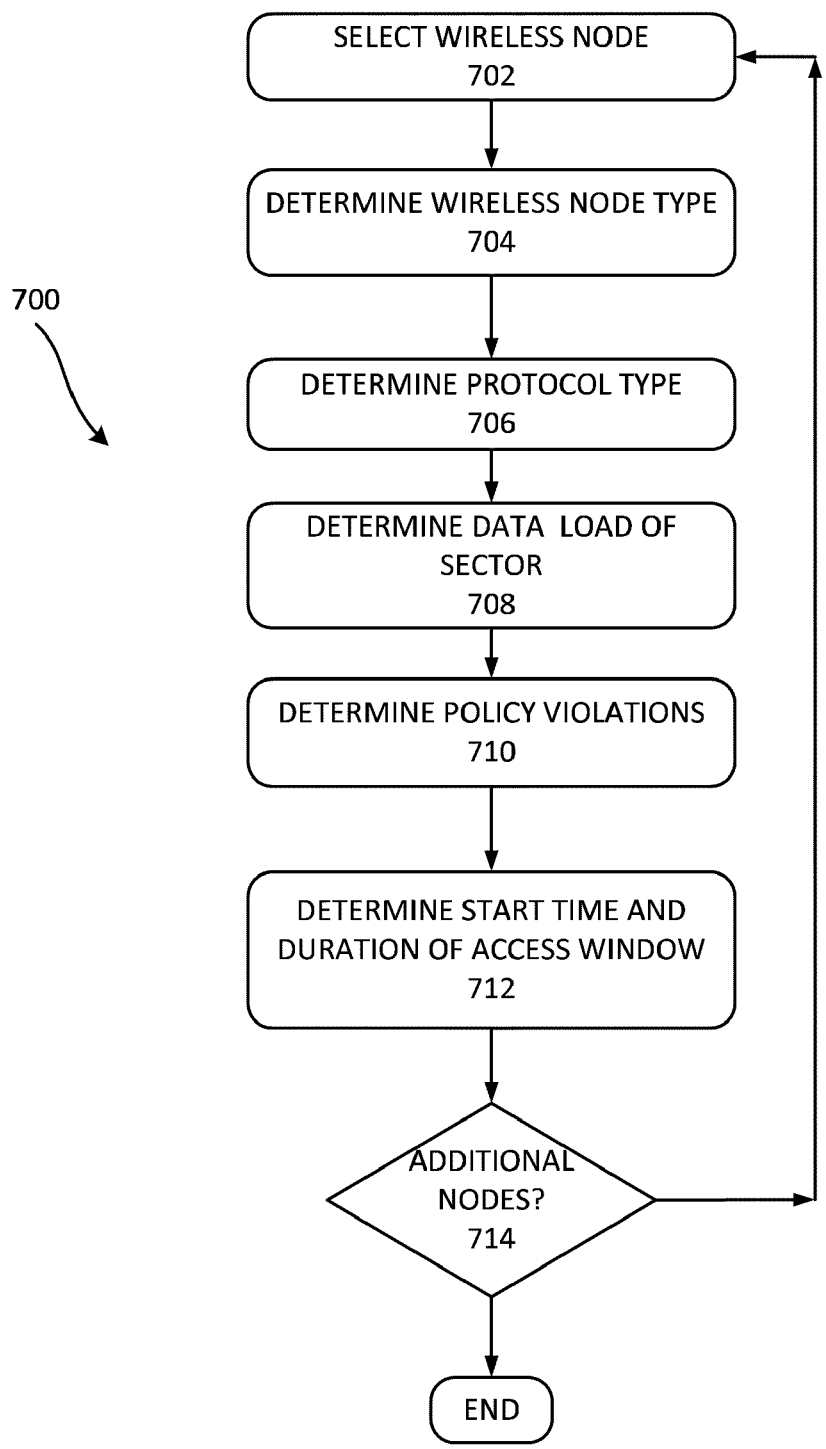
FIG. 7 is a flowchart of an exemplary process for scheduling an access window for a wireless node.

As mentioned above, a received packet may be stored in packet buffer 436 until an access window opens to transmit the packet to the appropriate wireless node. FIG. 7 is a flowchart of an exemplary process 700 for scheduling an access window between a wireless node and, for example, a PDSN. Process 700 may determine the start time and duration of windows during which packets may be sent to a wireless node. Process 700 may also determine the start time and duration of windows during which a wireless node may send packets to a BTS. Process 700 may take a number of conditions into account when scheduling an access window.

Process 700 may begin with the selection of a wireless node for which to determine an access window. Process 700 may select the wireless node, for example, because a packet is in packet buffer 436 or packet queue 440. The type of wireless node may be determined (block 704). For example, access window scheduler 410 may query AAA server 228 to determine the type of wireless node. Some wireless nodes (e.g., a dishwasher) may allow for longer periods of time between access windows than other devices (e.g., a laptop computer).

The type of protocol being employed by the wireless node may be determined (block 706). For example, access window scheduler 410 may examine a packet in packet buffer 436 and/or packet queue 440 to determine the type of protocol being used for the queued or buffered packet. Access window scheduler 410 may also query AAA server 228 and determine the protocol type based on the wireless node type. Some management protocols, for example, may allow for longer periods of time between access windows than other protocols, such as RTP.

The data load of the corresponding RF sector may be determined (block 708). Access window scheduler may query data load table 408 to determine the load of the RF sector corresponding to the selected wireless node. An RF sector experiencing a heavy load may schedule access windows farther apart and for a shorter time period, for example.

The number of policy violations may also be determined (block 710). For example, in one embodiment, if a wireless node continuously attempts to connect to a BTS against policy specified in AAA server 228, then the start time of an access window may be delayed and the duration shortened. Further, in this embodiment, the access window may open sooner for a packet destined to the wireless node than a packet originating from a wireless node. In another embodiment, process 700 may terminate an ongoing data session if a policy is violated (e.g., if a wireless node requests too many data connections). In one embodiment, AAA server 228 may receive access policies from policy server 234.

The start time and the duration of the access window may be determined (block 712). Access window scheduler 410 may take one or more of the conditions determined in blocks 702-710 into consideration when scheduling an access window for a wireless node. In one embodiment, access window scheduler 410 may query policy server 234 (e.g., rule table 454) or policy table 422 to determine how to schedule (e.g., determine the policy for scheduling) the start time and the duration of the access window. For example, after querying policy server 234 access window scheduler 410 may take the following conditions into account when scheduling an access window for wireless node 202-2: (1) as an appliance (e.g., a dishwasher as learned from AAA server 228), packets sent to wireless node 202-2 are likely less urgent than packets sent to some other wireless nodes; (2) the packets destined to and arriving from wireless node 202-2 (stored in packet queue 440 and/or packet buffer 436) are SNMP packets, a management protocol and not a real-time protocol; (3) RF sector ID 212-1S is currently experiencing a data load of 90%, according to data load table 408 of FIG. 5B; and (4) wireless node 202-2 and/or appliance server 250 have not violated any policies (e.g., sending packets outside of scheduled access windows). In view of these conditions, access window scheduler 410 may select a window (e.g., after querying policy server 234) of 10 seconds in duration and 3 hours in the future. In one embodiment, if the wireless node (for which the access window has been determined) is AWEC aware, then AWEC 232 may transmit the access window information to the wireless node. In this embodiment, repeated data connection requests from the wireless node (which may be denied, as discussed below) may be avoided. In one example, when to schedule an SNMP packet may depend on the number of SNMP requests received over a period of time (e.g., one hour). In this example, the more SNMP packets received, the more frequent an access window may be scheduled (e.g., if the volume of SNMP requests exceeds 30 per hour, the access window may open every 5 minutes; if after 6 hours the volume of requests decreases to 5 per hour or less, the access window may open every 15 minutes).

Depending on the above considerations, the access window may be scheduled to open in the future. For example, the window may be scheduled to open more than 1, 5, 10, 15, 20, 30, 45, or 60 minutes in the future. The window may be scheduled to open more than 1, 5, 10, 15, 20, or 24 hours in the future. Further, if there is a "mass event" either because (1) application server 250 sends out many packets to different nodes in the same RF sector, or (2) because multiple application servers coincidentally send messages simultaneously to different nodes in the same RF sector, the packets may be appropriately scheduled.

In one embodiment, AAA server 228 may also be updated with access window information. For example, AAA server 228 may deny a data connection authentication request with a wireless node that has violated policy terms. In another embodiment, AAA server 228, gateway 230, and/or home agent 224 may terminate a current data connection with a wireless node that has violated policy terms. In this embodiment, network 200 (e.g., a network provider) may dynamically control or block access to network 221 and/or network 240 by a wireless device 202-x that violates policies (e.g., policies stored in AAA server 228 and/or policy server 234).

Figure 8:
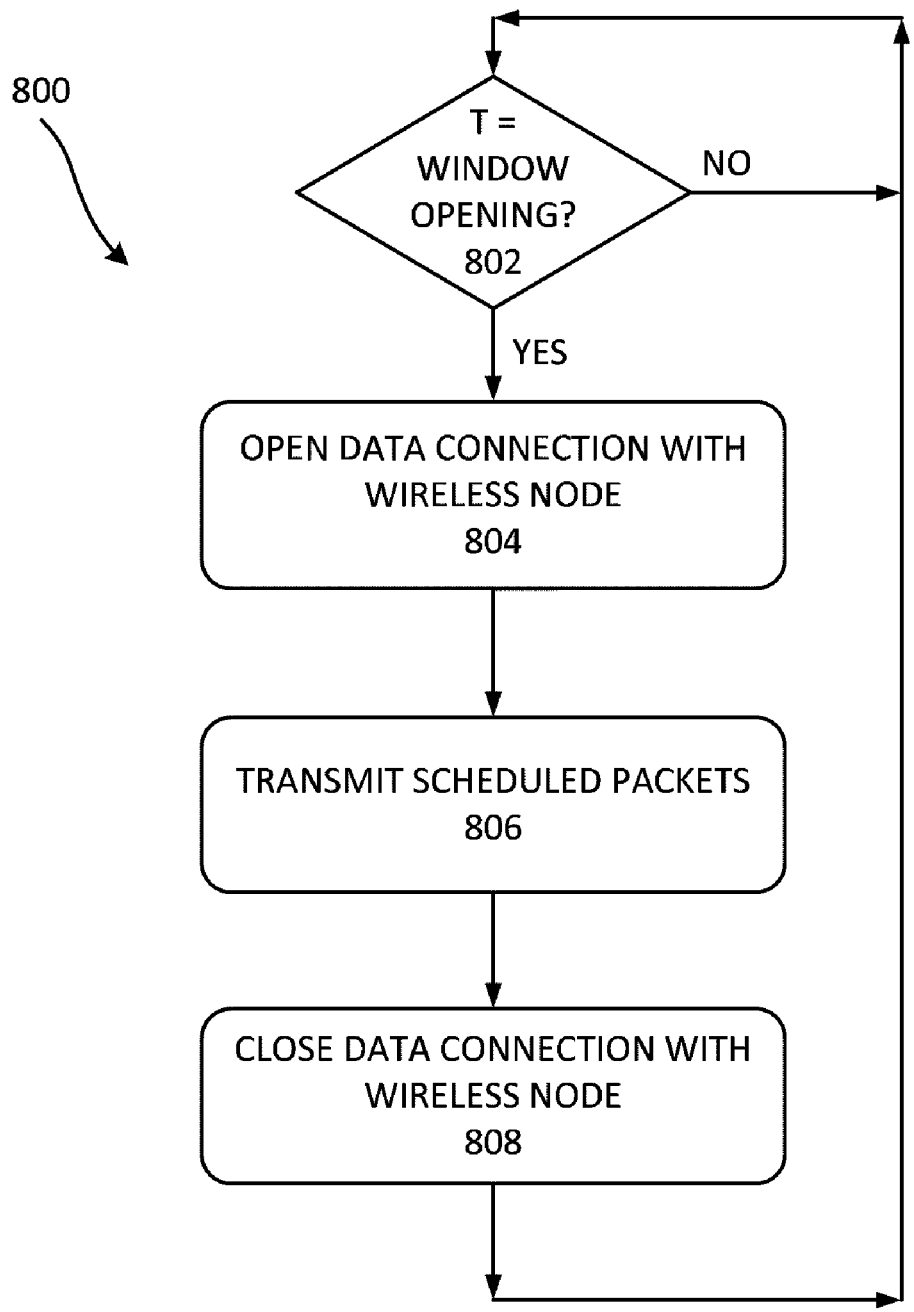
FIG. 8 is a flowchart of an exemplary process for sending packets to a wireless node in an access window.

Once an access window is scheduled, packets may be sent to a wireless node when, for example, the window for that mobile device opens. FIG. 8 is a flowchart of an exemplary process 800 for sending packets when an access window opens. Packet scheduler 434 may perform process 800.

Process 800 may begin at the time of the opening of an access window (block 802: YES). A data connection (e.g., a PPP connection between the wireless device and a PDSN) with the wireless node associated with the access window may be established (block 804). With a connection to the wireless node established, the scheduled packets may be transmitted (block 806). For example, gateway 230 may send any packets in packet buffer 436 to the wireless node. After the packets have been sent, the data connection with the wireless node may be closed (block 808) if no further communications are planned. In one embodiment, the data connection with the wireless node may time out after a period of time.

Process 800 may repeat and wait until the next scheduled access window opens. Likewise, if an access window has not opened (block 802: NO), then process 800 may wait until an access window does open. Multiple instances of process 800 may be running at a time, as BTS may establish multiple data connections at a time with multiple wireless nodes. In one embodiment, if the access window has not opened (block 802: NO), then a message may be periodically sent to the nodes that originated the packets stored in packet buffer 436 indicating that the window has not yet opened.

Figure 9:
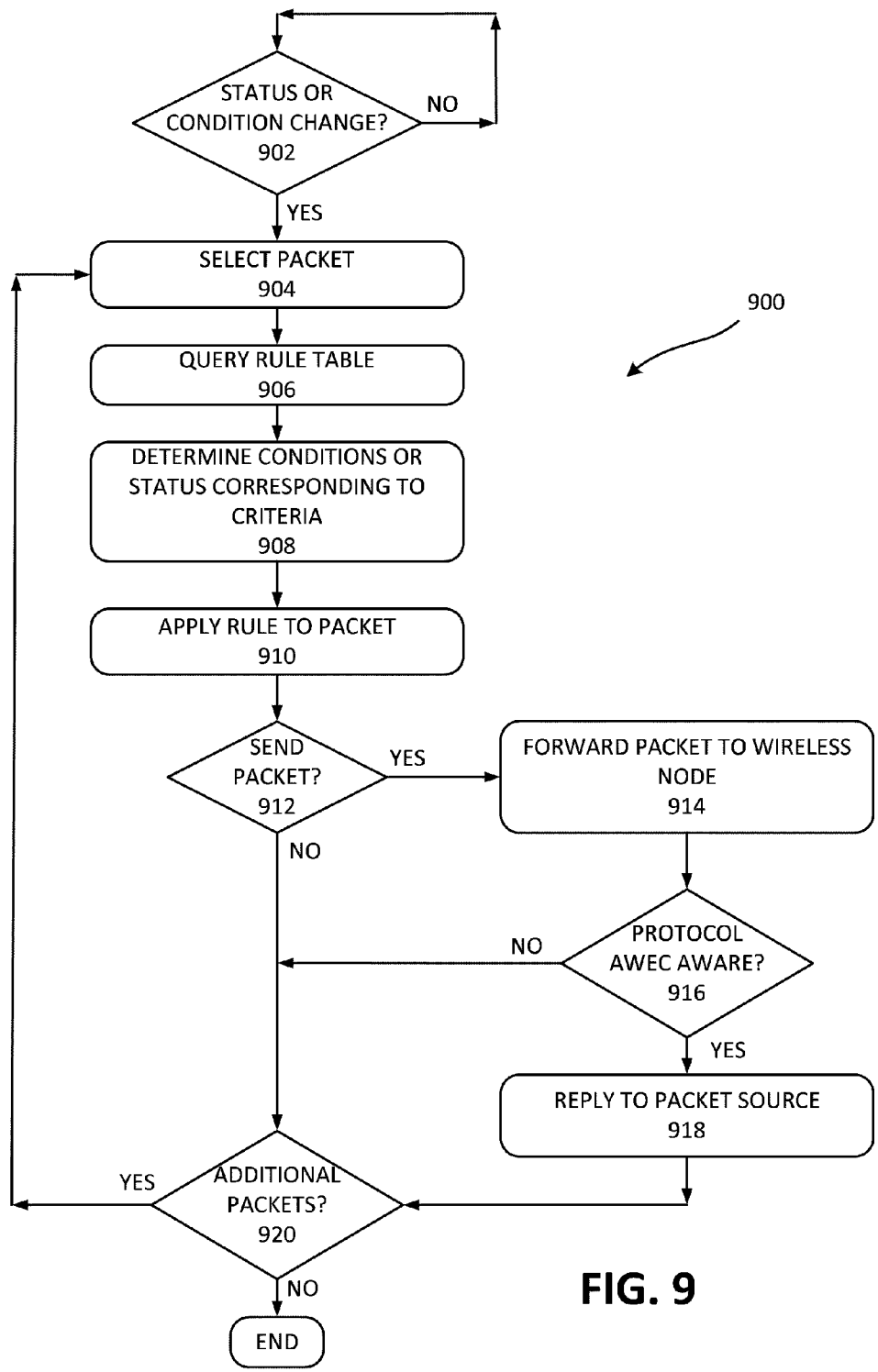
FIG. 9 is a flowchart of an exemplary process for forwarding packets stored in a queue or a buffer to a wireless node.

FIG. 9 is a flowchart of an exemplary process 900 for forwarding packets stored in packet queue 440 and/or packet buffer 436. In one embodiment, packet queue logic 438 executes process 900. As discussed above with respect to process 600 (block 608), sending packets to wireless nodes 202 may result in a data connection (e.g., a data session) being established to a wireless node. In this case, process 900 may consider sending other packets stored in packet buffer 436 or packet queue 440 that are destined to the same wireless node. For example, assume that an SNMP packet is scheduled for delivery to wireless node 202-2 during the next window as a result of the application of rule 554-3 in process 600. Then, as a result of an unrelated event (e.g., a response to a web resource request) a packet is forwarded to wireless node 202-2, thus opening a data session between PDSN 222 and wireless node 202-2. In this case, the scheduled SNMP packet may also be forwarded to wireless node 202-2 at the same time because of the application of rule 554-2 (e.g., a light data load and an active data session state).

Process 900 may begin with the change of a condition or status of a criterion specified in rule table 454 (block 902: YES). In the example given above, a data session may change from idle to active for a wireless node (e.g., node 202-2). Process 900 may then select a packet to determine if the changed condition would then allow the selected packet to meet the criteria of one of the rules in table 454. In one embodiment, a packet may be selected from either packet queue 440 (e.g., a best-effort packet) or packet buffer 436 (e.g., a scheduled packet). In the example above, the opening of a data session to wireless node 202-2 changes the condition of a data session, for example.

The rule table may be queried (block 906), the conditions for the criteria in the rules may be determined (block 908), and the rule may be applied to the selected packet (block 910). Blocks 906, 908 and 910 are similar to blocks 610, 612, and 614 discussed above with respect to process 600. If one of the rules permits (block 912: YES), the selected packet may be forwarded to the appropriate wireless node (block 914). If the protocol corresponding to the forwarded packet is aware of AWEC (block 916: YES), then a reply packet may be sent to the packet source (e.g., application server 250) (block 918). For example, if an SNMP packet is queued in packet queue 440 by gateway 230 as a result of the application of rule 554-1, and then sent (block 914), a packet may be sent to application server 250 indicating to it that the queued packet was sent to the wireless node. Thus, application server 250, aware of AWEC, may expect a response from wireless node 202-2, for example. If there are additional packets in buffer 436 or in queue 440 (block 920: YES), then another packet may be selected and process 900 may repeat.

In one embodiment, because protocol proxy 420 may be aware of the state of the protocol to which the received packet belongs or aware of the semantics of the protocol, gateway 230 may send less than all the packets queued or buffered. For example, if an SNMP protocol sent the GET packet multiple times or if a VPN packets sends multiple "keep alive" packets, then gateway 230 may forward only one of the packets rather than all of them. In one embodiment, a network administrator (e.g., the network provider) may configure the policies stored in policy server 234 such that the number and type of packets stored in packet buffer 436 and/or packet queue 440 may based on criteria, such as the protocol type, data load status, session status, etc.

Figure 10:
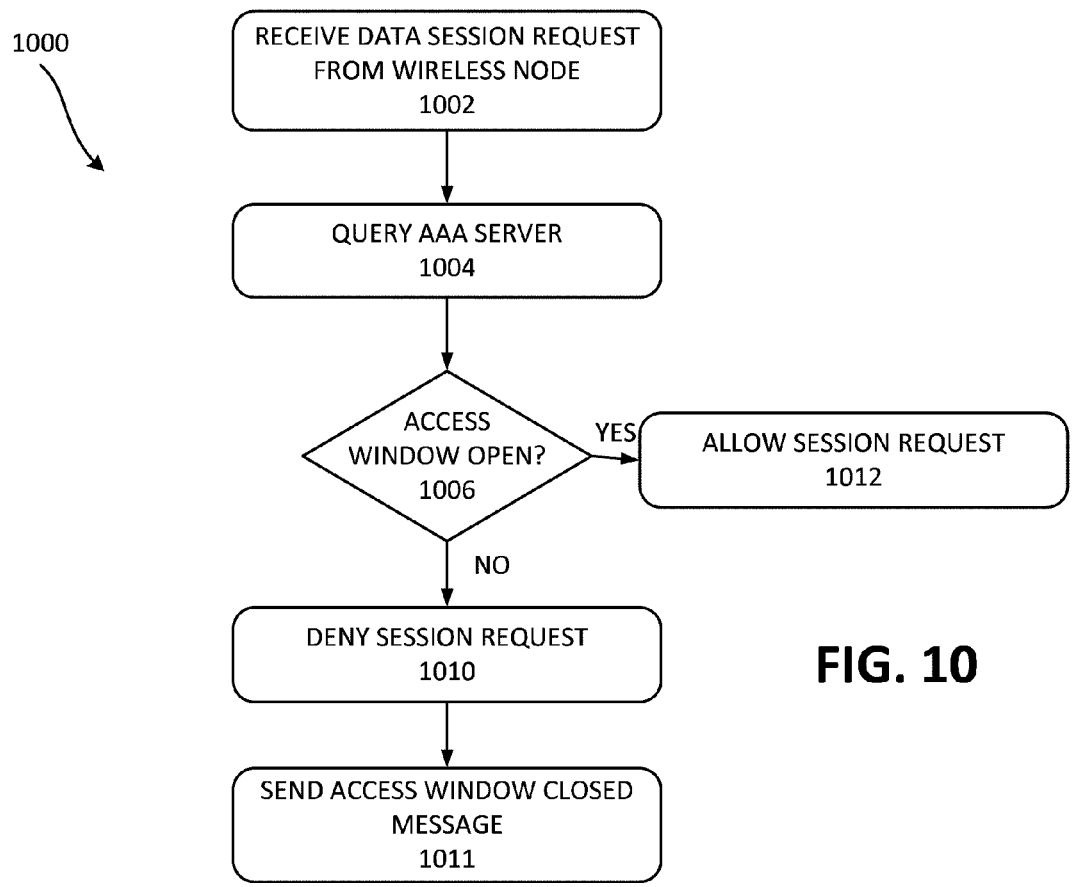
FIG. 10 is a flowchart of an exemplary process for accepting or denying a connection request from a wireless node.

FIG. 10 is a flowchart of an exemplary process 1000 for accepting or denying a data session request from a wireless node. PDSN 222 may execute process 1000, for example. Process 1000 may begin when a BTS receives a request from a wireless node to establish a data session (e.g., a PPP connection between wireless node 202-1 and PDSN 222. Before accepting the request, AAA server 228 may be queried (block 1004) to authenticate and authorize the wireless node that requested a connection. For example, PDSN 222 may query AAA server 228 to determine if the wireless node is authentic. As discussed above with respect to block 712 of process 700, AAA server 228 may store access window information. For example, if the access window for the wireless node is open (block 1006: yes), then AAA server 228 may respond to PDSN 222 indicating that the wireless node is authentic and authorized. In this case, the data session request may be allowed (block 1012). If, on the other hand, the access window for the wireless node is closed (block 1006: NO), the session request may be denied (block 1010). For example, if the wireless node has previously been requesting too many connects (or for any other reason according to policy server 234), then AAA server 228 may store information indicating that the access window for the wireless node is some time in the future. Thus, AAA server 228 may respond to PDSN 222 indicating that, while the wireless node may be authentic, the connection request may be denied (block 1010). In one embodiment, the denial of the request may be accompanied by an "access window closed" message (e.g., a type of error message) (block 1011). In another embodiment, if the wireless node is AWEC aware, a connection may be established for the purpose sending access window information to the wireless node so that the wireless node can schedule the next connection request.

Figure 11:
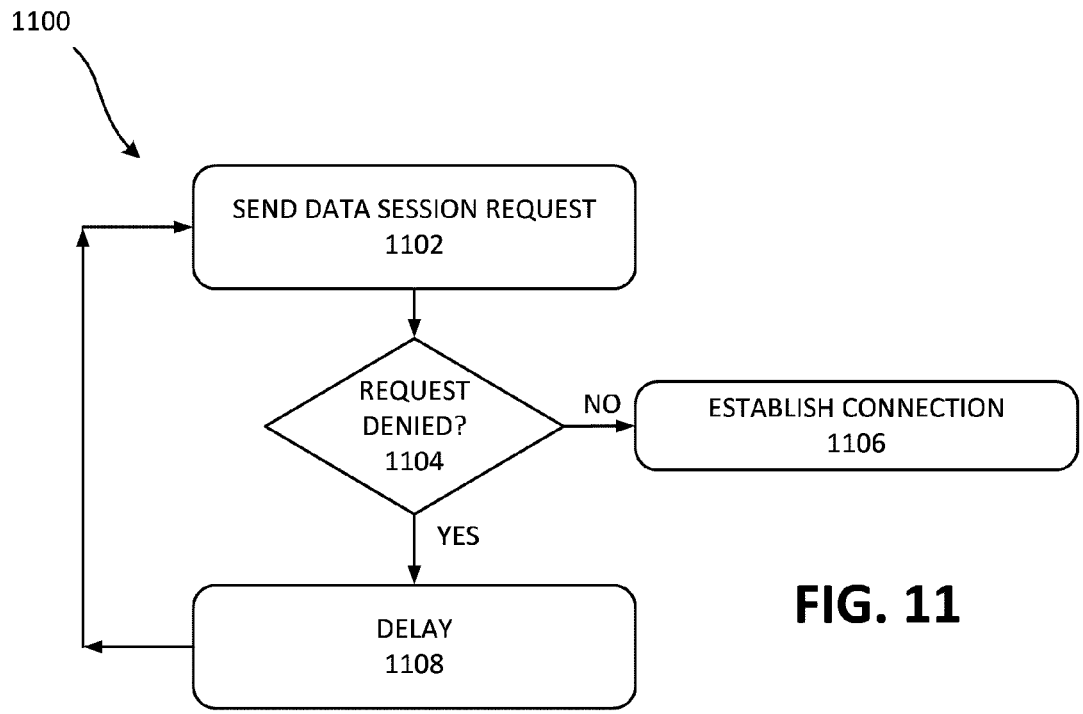
FIG. 11 is a flowchart of an exemplary process for requesting a connection request in a wireless node.

FIG. 11 is a flowchart of an exemplary process for requesting a data session request with a BTS. Process 1100 may be executed in a wireless node, for example. Process 1100 may begin with the wireless node (e.g., wireless node 202-1) sending a connection request to a BTS, which may be forwarded to a PDSN, as described above. If the request is accepted (block 1104: YES), then a connection may be established (block 1106). If, on the other hand, a connection is denied, the wireless node may delay for a time (block 1108) before sending a request for a data session again (block 1102). The delay (block 1108) may vary depending on the circumstances (e.g., 1 minute for the first delay, 2 minutes for the second delay, 4 minutes for the third delay, etc.).

Figure 12:
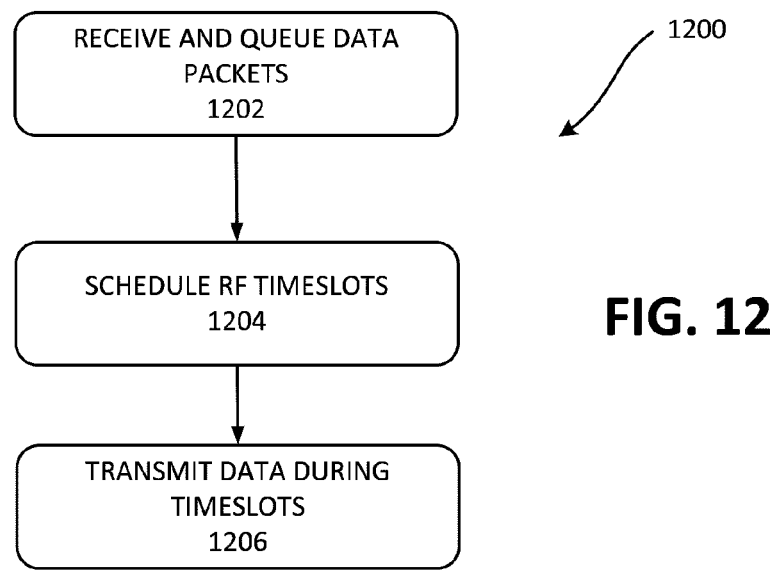
FIG. 12 is a flowchart of an exemplary process for transmitting data during scheduled RF timeslots.

FIG. 12 is a flowchart of an exemplary process for transmitting data during scheduled RF timeslots. All or portions of process 1200 may be executed by RF timeslot scheduler 462 in BTS 212-1, for example. As discussed above with respect to process 600 (block 608), sending packets to wireless nodes 202 may result in data being sent through home agent 224, PCF server 216, RNC 214, and BTS 212-1. Thus, process 1200 may begin with the receipt of data packets and the queuing of those data packets (block 1202). For example, BTS 212-1 may receive and queue data packets from multiple sources that are destined to different wireless nodes 202. RF timeslots may be scheduled (block 1204). For example, as discussed above, RF timeslot scheduler 462 may schedule the duration (e.g., 1.7 ms) and start time of RF timeslots for transmitting data to wireless nodes 202. The data may be transmitted during the scheduled RF timeslots (block 1204). In one embodiment, a single packet may occupy multiple RF timeslots.

Figure 13:
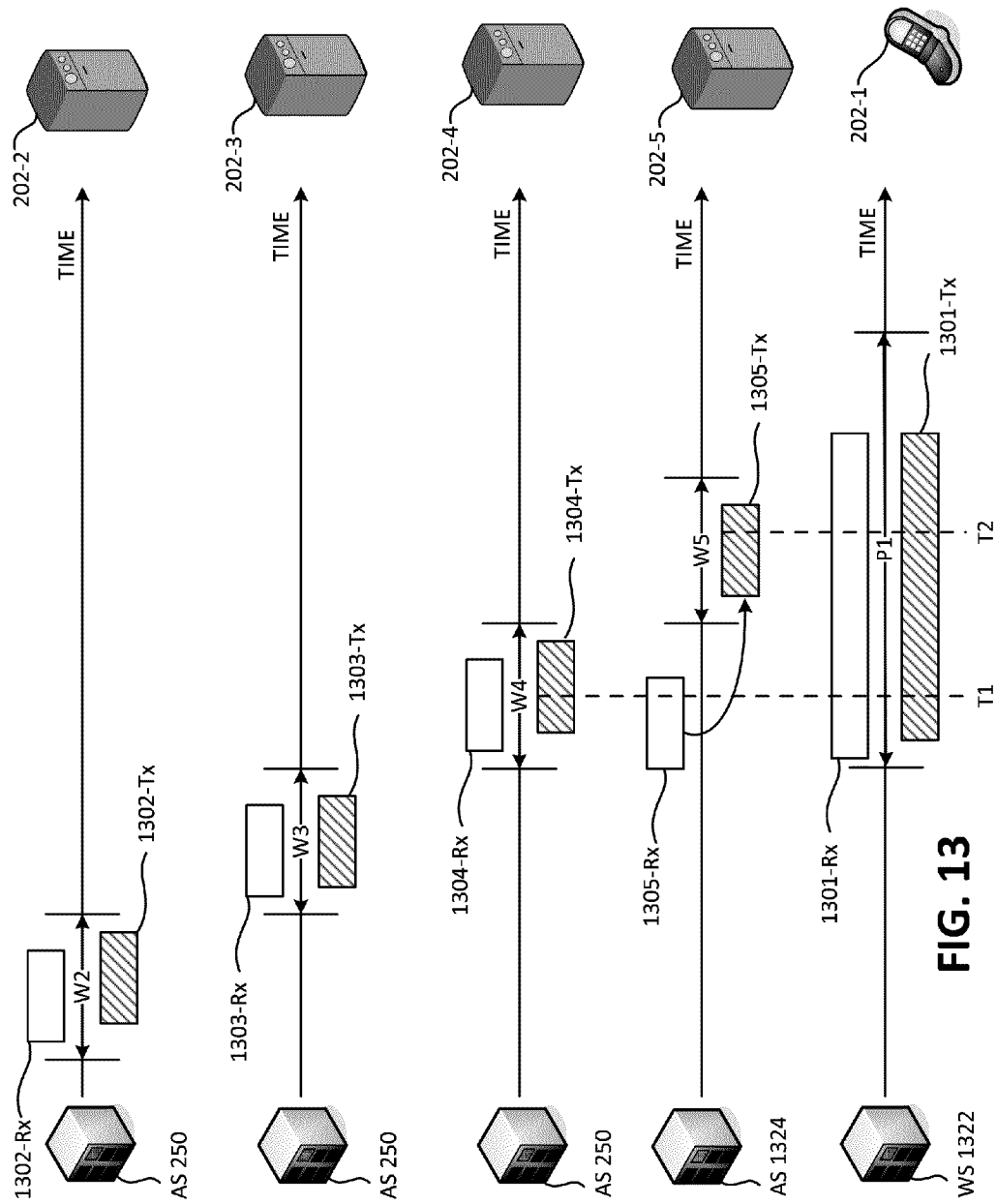
FIG. 13 is a timing diagram, including exemplary access windows, for receiving and transmitting data.

FIG. 13 is a timing diagram, including exemplary access windows, for receiving data and transmitting data to wireless nodes. The example FIG. 13 includes five wireless nodes in the same RF sector (e.g., mobile phone 202-1 and dishwashers 202-2 through 202-5), an application server 250 (AS 250), a web server 1322 (WS 1322), and an application server 1324 (AS 1324). In the following example, application server 250 is AWEC aware, but application server 1324 is not AWEC aware. The timing diagram shows the timing of data being received in gateway 230 (not shown in FIG. 13) from application server 250 for forwarding to dishwashers 202-2, 202-3, and 202-4. The timing diagram also shows the timing of data being received in gateway 230 (not shown in FIG. 13) from application server 1324 for forwarding to dishwasher 202-5. Finally, the timing diagram shows the timing of data being received in gateway 230 (not shown in FIG. 13) from web server 1322 for forwarding to mobile phone 202-1.

In this example, AWEC 232 has scheduled four access windows W2, W3, W4, and W5. Access windows W2, W3, and W4 are for receiving data (e.g., SNMP data) from application server 250 for dishwashers 202-2, 202-3, and 202-4, respectively. Access window W5 is for receiving data (e.g., SNMP data) from application server 1324. As shown in FIG. 13, access windows W2, W3, W4, and W5 are staggered. Staggering access windows W2, W3, W4, and W5 may help reduce the peak data load in the corresponding RF sector. AWEC 232 may have communicated the access window information (e.g., the start times and durations of windows W2 through W4) to application server 250 through, for example, process 600 (e.g., block 624) and/or process 900 (block 918) described above. Because application server 1324 is not AWEC aware, no access window information has been sent to application server 1324.

Application gateway 230 receives managed data 1302 (labeled 1302-Rx in FIG. 13) during window W2, receives managed data 1303 (labeled 1303-Rx) during window W3, and receives managed data 1304 (labeled 1304-Rx) during window W4. Because managed data 1302 arrives during scheduled window W2, managed data 1302 may be forwarded (e.g., transmitted) (labeled 1302-Tx in FIG. 13) to dishwasher 202-2 without any additional delays. Likewise, because managed data 1303 arrives during scheduled window W3, managed data 1303 may be forwarded (e.g., transmitted) (labeled 1303-Tx in FIG. 13) to dishwasher 202-3 without any additional delays. Further, because managed data 1304 arrives during scheduled window W4, managed data 1304 may be forwarded (e.g., transmitted) (labeled 1303-Tx in FIG. 13) to dishwasher 202-3 without any additional delays.

On the other hand, application gateway 230 receives managed data 1305 (labeled 1305-Rx) before window W5 opens. Because managed data 1305 arrives before the scheduled window W5, managed data 1303 may be buffered (e.g., in scheduled packet buffer 436) until scheduled window W5 opens. When window W5 opens, managed data 1305 may be forwarded (e.g., transmitted) (labeled 1305-Tx in FIG. 13) to dishwasher 202-5 without any additional delays.

Application gateway 230 also receives unmanaged data 1301 (e.g., as a result of a web request form mobile phone 202-1) (labeled 1301-Rx in FIG. 13) during a period P1 that overlaps with access windows W4 and W5. Because data 1301 is unmanaged, data 1301 may be forwarded (e.g., transmitted) (labeled 1301-Tx in FIG. 13) to mobile phone 202-1 without additional delay. In this example, because managed data 1305 has been held until window W5 opens, the peak data rate to the RF sector shared by wireless nodes 202 in FIG. 13 may be reduced. In other words, if managed data 1305 had not been delayed, then BTS 212-1 in the RF sector would be transmitting data to three devices at once (e.g., at time T1) rather than a maximum of two devices at once (e.g., at times T1 and T2). In this case, the user of mobile phone 202-1 may experience a faster response to his web request. During transmission of data (e.g., at time T2), BTS 202-1 may schedule timeslots, for example, and alternate transmitting data between mobile phone 202-1 and dishwasher 202-5 (even alternating between mobile phone 202-1 and dishwasher 202-5 in the middle of conveying a packet of data).

In one embodiment, wireless nodes may be AWEC-aware and may receive scheduling information from AWEC 232. In this embodiment, AWEC logic running in the wireless device may queue packets that may require a connection request until an access window opens. Alternatively, AWEC logic running in the wireless device may transmit the queued packets when an access window opens for other, possibly unrelated, reasons.

In one embodiment, because gateway 230 may inspect packets at the application level and interpret syntax, the state of the protocol, etc., gateway 230 may also act as a trusted proxy in cases where traffic is encrypted. As a trusted proxy, packets may be unencrypted and then encrypted again before transmission to the wireless node. In one embodiment, a AWEC-aware version of a protocol may include sufficient unencrypted information such that gateway 230 may appropriately schedule a packet without having to decrypt the entire packet. In one embodiment, a parallel session may exist between application server 250 and protocol proxy 420 for carrying AWEC information. In another embodiment, protocol payload information may be encapsulated in an AWEC session between application server 250 and protocol proxy 420.

One or more embodiments disclosed above may allow for the preservation of RF resources by reducing RF channel uptime related to some data traffic (e.g., traffic related to routine access to wireless nodes to monitor health and performance or management traffic). One embodiment disclosed above also allows for some data (e.g., real-time data) to be forwarded to a wireless node without additional delay.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

The terms "buffer" and "queue," as used herein have the same meaning. Likewise, the terms "buffering" and "queuing" have the same meaning. Although some embodiments disclosed herein may help preserve RF assets, one or more embodiments may provide benefits even while not necessarily preserving RF assets (e.g., while increasing the burden on RF assets).

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
receiving a packet destined to a wireless node;
buffering the packet;
scheduling a time at which to transmit the packet to the wireless node, wherein scheduling the packet includes determining an application-layer protocol associated with the packet and basing the time at which to transmit on the determined application-layer protocol; and
wirelessly transmitting the packet to the wireless node at the scheduled time.

2. The method of claim 1, wherein scheduling the time at which to transmit the packet includes determining a semantic of the application-layer protocol associated with the packet.

3. The method of claim 2, wherein scheduling the time at which to transmit the packet includes determining a state of the application-layer protocol associated with the packet.

4. The method of claim 1, further comprising:
determining a data load of a transceiver for transmitting the packet to the wireless node, wherein the transceiver is configured to communicate with a plurality of wireless devices simultaneously,
wherein scheduling the time at which to transmit the packet includes scheduling the time based on the determination of the data load of the transceiver.

5. The method of claim 4, wherein determining the data load includes determining the number of active data sessions between the transceiver and wireless nodes.

6. The method of claim 5, wherein determining the data load includes determining the cumulative data rate of active data sessions between the transceiver and wireless nodes.

7. The method of claim 1, further comprising:
determining whether to buffer the packet and whether to schedule the time based on the application-layer protocol associated with the packet.

8. The method of claim 1, further comprising:
sending information to a node that originated the packet indicating that the packet is buffered.

9. The method of claim 8, further comprising:
sending information to the node that originated the packet indicating that the packet is scheduled to be wirelessly transmitted at the scheduled time.

10. The method of claim 8, further comprising:
defining an access window during which the node that originated the packet is scheduled to transmit an additional packet associated with the determined application-layer protocol; and
sending information defining the access window to the node that originated the packet.

11. A method comprising:
receiving a packet destined to a wireless node;
buffering the packet;
scheduling a time at which to transmit the packet to the wireless node, wherein scheduling the packet includes determining a semantic of a management protocol associated with the packet and basing the time at which to transmit the packet on the determined semantic, wherein the management protocol includes an application-layer protocol or a network-layer protocol; and
wirelessly transmitting the packet to the wireless node at the scheduled time.

12. The method of claim 11, wherein scheduling the time at which to transmit the packet includes determining a state of the management protocol.

13. The method of claim 11, further comprising:
determining a data load of a transceiver for transmitting the packet to the wireless node, wherein the transceiver is configured to communicate with a plurality of wireless devices simultaneously,
wherein scheduling the time at which to transmit the packet includes scheduling the time based on the determination of the data load of the transceiver.

14. The method of claim 13, wherein determining the data load includes determining the number of active data sessions between the transceiver and wireless nodes or determining the cumulative data rate of active data sessions between the transceiver and wireless nodes.

15. A system comprising:
a network device including
a transceiver to receive a packet destined to a wireless node;
a memory to buffer the packet; and
a processor to schedule a time at which to transmit the packet to the wireless node, wherein scheduling the packet includes determining an application-layer protocol associated with the packet,
wherein the transceiver wirelessly transmits the packet to the wireless node at the scheduled time.

16. The system of claim 15, wherein the processor schedules the time at which to transmit the packet based on a semantic of the application-layer protocol associated with the packet.

17. The system of claim 16, wherein the processor schedules the time at which to transmit the packet based on a state of the application-layer protocol associated with the packet.

18. The system of claim 15,
wherein the processor determines a data load of a transceiver for transmitting the packet to the wireless node,
wherein the transceiver is configured to communicate with a plurality of wireless devices simultaneously, and
wherein the processor schedules the time at which to transmit the packet based on the determination of the data load of the transceiver.

19. The system of claim 18, wherein the processor determines the data load based on the number of active data sessions between the transceiver and wireless nodes.

20. The system of claim 19, wherein the processor determines the data load based on the cumulative data rate of active data sessions between the transceiver and wireless nodes.

21. The system of claim 15, wherein the processor determines whether to buffer the packet and whether to schedule a time based on the application-layer protocol associated with the packet.

22. The system of claim 15, wherein the transceiver sends information to a node that originated the packet to indicate that the packet is buffered.

23. The system of claim 22, wherein the transceiver sends information to the node that originated the packet to indicate that the packet is scheduled to be wirelessly transmitted at a scheduled time.

24. The system of claim 22,
wherein the processor defines an access window during which the node that originated the packet is scheduled to transmit an additional packet associated with the determined application-layer protocol; and
wherein the transmitter sends information defining the access window to the node that originated the packet.

* * * * *